(12) United States Patent
Dainese, Jr. et al.

(10) Patent No.: US 12,422,613 B2
(45) Date of Patent: Sep. 23, 2025

(54) HOLLOW-CORE OPTICAL FIBERS

(71) Applicant: CORNING INCORPORATED, Corning, NY (US)

(72) Inventors: Paulo Clovis Dainese, Jr., Painted Post, NY (US); Wei Jiang, Vestal, NY (US); Ming-Jun Li, Horseheads, NY (US); Xiaojun Liang, Chino Hills, CA (US); Dan Trung Nguyen, Painted Post, NY (US); Ilia Andreyevich Nikulin, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 233 days.

(21) Appl. No.: 18/226,343

(22) Filed: Jul. 26, 2023

(65) Prior Publication Data

US 2024/0036253 A1 Feb. 1, 2024

Related U.S. Application Data

(60) Provisional application No. 63/467,064, filed on May 17, 2023, provisional application No. 63/467,087, (Continued)

(51) Int. Cl.
*G02B 6/032* (2006.01)
*C03B 37/012* (2006.01)
(Continued)

(52) U.S. Cl.
CPC ............ *G02B 6/032* (2013.01); *C03B 37/012* (2013.01); *C03B 37/0256* (2013.01); (Continued)

(58) Field of Classification Search
None
See application file for complete search history.

(56) References Cited

U.S. PATENT DOCUMENTS 6,480,659 B1 * 11/2002 Patlakh .............. G02B 6/02357
385/125
7,272,285 B2 9/2007 Benoit et al.
(Continued)

FOREIGN PATENT DOCUMENTS

CN 206134312 U * 4/2017
CN 110100196 A * 8/2019 ......... G02B 6/02361
(Continued)

OTHER PUBLICATIONS

Amrani, et al., "Low-loss single-mode hybrid-lattice hollow-core photonic-crystal fibre", Light: Science & Applications, vol. 10, No. 1, 2021, pp. 1-12.
(Continued)

*Primary Examiner* — Chris H Chu
(74) *Attorney, Agent, or Firm* — Kevin L. Bray

(57) ABSTRACT

A hollow-core optical fiber may include a substrate having a tubular shape and an inner surface surrounding a central longitudinal axis of the hollow-core optical fiber; a hollow core extending through the substrate along the central longitudinal axis of the hollow-core optical fiber; and a plurality of cladding elements positioned between the central longitudinal axis of the hollow-core optical fiber and the substrate. Each of the plurality of cladding elements may extend in a direction parallel to the central longitudinal axis of the hollow-core optical fiber. Each of the plurality of cladding elements may include a wound glass sheet configured as a spiral, and each of the plurality of cladding elements may contact an interior surface of the substrate.

20 Claims, 14 Drawing Sheets

Related U.S. Application Data filed on May 17, 2023, provisional application No. 63/394,126, filed on Aug. 1, 2022.

(51) Int. Cl.
    *C03B 37/025*     (2006.01)
    *G02B 6/02*     (2006.01)
    *G02B 6/036*     (2006.01)

(52) U.S. Cl.
    CPC ..... *G02B 6/02328* (2013.01); *G02B 6/02361* (2013.01); *G02B 6/02376* (2013.01); *G02B 6/03622* (2013.01); *C03B 2203/16* (2013.01)

(56) References Cited

U.S. PATENT DOCUMENTS

| | | | |
|---|---|---|---|
| 7,310,466 B2 * | 12/2007 | Fink | G02B 6/02361 385/100 |
| 8,181,485 B2 | 5/2012 | Coffey et al. | |
| 8,359,884 B2 | 1/2013 | Hawtof | |
| 8,438,876 B2 | 5/2013 | Noni, Jr. | |
| 10,185,084 B2 | 1/2019 | Butler et al. | |
| 10,393,956 B2 | 8/2019 | Russell et al. | |
| 10,816,721 B1 | 10/2020 | Chenard et al. | |
| 10,859,763 B2 | 12/2020 | Xu et al. | |
| 12,298,554 B2 | 5/2025 | Fiacco et al. | |
| 2004/0223715 A1 | 11/2004 | Benoit et al. | |
| 2005/0226579 A1 | 10/2005 | Fink et al. | |
| 2005/0232560 A1 | 10/2005 | Knight et al. | |
| 2006/0193583 A1 | 8/2006 | Dong et al. | |
| 2006/0201206 A1 * | 9/2006 | Benoit | C03C 25/1061 65/389 |
| 2007/0053640 A1 * | 3/2007 | Goell | A61B 18/22 385/125 |
| 2017/0160467 A1 | 6/2017 | Poletti et al. | |
| 2020/0024178 A1 | 1/2020 | Corrado et al. | |
| 2020/0278491 A1 | 9/2020 | Poletti et al. | |
| 2024/0034664 A1 | 2/2024 | Dainese et al. | |
| 2024/0036249 A1 | 2/2024 | Drake et al. | |
| 2024/0036252 A1 | 2/2024 | Dainese et al. | |
| 2024/0150218 A1 | 5/2024 | Dainese et al. | |
| 2024/0150219 A1 | 5/2024 | Dainese et al. | |
| 2025/0197273 A1 | 6/2025 | Drake et al. | |

FOREIGN PATENT DOCUMENTS

| | | |
|---|---|---|
| CN | 111257992 A | 6/2020 |
| CN | 114721084 A | 7/2022 |
| GB | 2526879 A | 12/2015 |
| WO | 2003/050571 A2 | 6/2003 |
| WO | 2020/210208 A1 | 10/2020 |
| WO | 2021/009239 A1 | 1/2021 |

OTHER PUBLICATIONS

B. Temelkuran et al., "Wavelength-scalable hollow optical fibres with large photonic bandgaps for CO2 laser transmission", Nature, vol. 420, 2002, pp. 650-653.

F. Poletti, "Nested antiresonant nodeless hollow core fiber", Opt. Express, vol. 22, 2014, pp. 23807-23828.

Francesco Poletti: "Nested antiresonant nodeless hollow core fiber", Optics Express, vol. 22, No. 20, Oct. 6, 2014 (Oct. 6, 2014), pp. 23807-23828.

Hayashi et al., "Numerical modeling of a hybrid hollow-core fiber for enhanced mid-infrared guidance", Optics Express, vol. 29, 2021, pp. 17042-17052.

Hu et al., "Design of Negative Curvature Hollow Core Fiber Based on Reinforcement Learning." Journal of Lightwave Technology 38, No. 7 (2020), pp. 1959-1965.

International Search Report and Written Opinion of the International Searching Authority; PCT/US2023/028629; dated Nov. 17, 2023; 11 pages; European Patent Office.

Khashan et al., "Dispersion of the optical constants of quartz and polymethyl methacrylate glasses in a wide spectral range: 0.2-3 μm." Optics Communications 188, No. 1-4 (2001), pp. 129-139.

Liu et al., "Fabrication and sensing applications of special microstructured optical fibers." Selected Topics on Optical Fiber Technologies and Applications; Xu, F., Mou, C., Eds (2017), pp. 1-20.

P. Yeh, et al., "Theory of Bragg fiber", Opt. Soc. Am., vol. 68, 1978, pp. 1196-1201.

S. G. Johnson et al., "Low-loss asymptotically single-mode propagation in large-core OmniGuide fibers", Opt. Express, vol. 9, 2001, pp. 748-779.

Sakr et al., "Hollow Core NANFs with Five Nested Tubes and Record Low Loss at 850, 1060, 1300 and 1625nm", OFC 2021.

Selim et al: "Single-mode, low loss hollow-core anti-resonant fiber designs", Optics Express, vol. 27, No. 4, Feb. 18, 2019 (Feb. 18, 2019), 13 pages.

Shemuly, et al., "Asymmetric wave propagation in planar chiral fibers", Optics express, vol. 21, No. 2, 2013, pp. 1465-1472.

Y. Xu et al., "Asymptotic Matrix Theory of Bragg Fibers" J. of Lightwave Technol., vol. 20, 2002, pp. 428-440.

Yang, et al., "Low Loss Hollow-Core Connecting-Circle Negative-Curvature Fibres." IEEE Photonics Journal, vol. 13, No. 1, 2021, pp. 1-10.

Yurii A et al: "Hollow core Bragg fiber with antiresonant intermediate layer", Proceedings of SPIE, vol. 10176, Nov. 9, 2016, pp. 101760L-101760L.

Zhu, et al., "Low loss hollow-core antiresonant fiber with nested supporting rings", Optics Express, vol. 29, No. 2, 2021, pp. 1659-1665.

A. D. Pryamikov et al., "Demonstration of a waveguide regime for a silica hollow-core microstructured optical fiber with a negative curvature of the core boundary in the spectral region > 3.5 μm", Optics Express, vol. 19, 2011, pp. 1441-1448.

C. Wei et al., "Negative curvature fibers", Advances in Optics and Photonics, vol. 9, 2017, pp. 504-561.

E. N. Fokoua, et al., "Analysis of light scattering from surface roughness in hollowcore photonic bandgap fibers," Opt. Express, vol. 20, No. 19, 2012, p. 20980-20991.

G. T. Jasion et al., "Hollow Core NANF with 0.28 dB/km Attenuation in the C and L Bands", paper Th4B.4, OFC 2020.

P. St.J. Russell, "Photonic-cystal fibers," J. Lightwave Technol. vol. 24, 2006, pp. 4729-4749.

Poletti, "Nested Antiresonant Nodeless Hollow Core Fiber", Opt. Express, vol. 22, 2014, p. 23807-23828.

Shaha, et al., "Low loss double cladding nested hollow core antiresonant fiber", OSA Continuum, vol. 3, No. 9, 2020, pp. 2512-2524.

Zhu, Yunhao, Ningfang Song, Fuyu Gao, and Xiaobin Xu. "Low loss hollow-core antiresonant fiber with nested supporting rings." Optics Express 29, No. 2 (2021): 1659-1665.

* cited by examiner

HOLLOW-CORE OPTICAL FIBERS

This application claims the benefit of priority under 35 U.S.C § 120 of U.S. Provisional Application Ser. No. 63/467,087 filed on May 17, 2023, U.S. Provisional Application Ser. No. 63/467,064 filed on May 17, 2023, and U.S. Provisional Application Ser. No. 63/394,126 filed on Aug. 1, 2022, the content of which is relied upon and incorporated herein by reference in its entirety.

FIELD

The present specification generally relates to optical fibers and, more specifically, to hollow-core optical fibers.

TECHNICAL BACKGROUND

Hollow-core optical fibers transmit light through a hollow core. Loss of light from the hollow core along the length of the optical fiber may be an impediment to implementing hollow-core optical fibers in practical applications. Accordingly, a need exists for hollow-core optical fibers having structures that confine light to the hollow core, thereby reducing light loss from the hollow core along the length of the optical fiber.

SUMMARY

According to a first aspect of the present disclosure, a hollow-core optical fiber comprises a substrate, the substrate comprising a tubular shape and an inner surface surrounding a central longitudinal axis of the hollow-core optical fiber; a hollow core extending through the substrate along the central longitudinal axis of the hollow-core optical fiber; and a plurality of cladding elements positioned between the central longitudinal axis of the hollow-core optical fiber and the substrate, each of the plurality of cladding elements extending in a direction parallel to the central longitudinal axis of the hollow-core optical fiber and comprising a wound glass sheet configured as a spiral, wherein each of the plurality of cladding elements contacts the inner surface of the substrate.

A second aspect of the present disclosure may include the first aspect, wherein the hollow-core optical fiber comprises greater than or equal to 3 and less than or equal to 11 cladding elements.

A third aspect of the present disclosure may include the first aspect or the second aspect, wherein the spiral comprises greater than or equal to 2 and less than or equal to 12 turns.

A fourth aspect of the present disclosure may include any of the first through third aspects, wherein the wound glass sheet has a thickness greater than or equal to 0.1 µm and less than or equal to 4.0 µm.

A fifth aspect of the present disclosure may include any of the first through fourth aspects, wherein the wound glass sheet has a thickness greater than or equal to 0.35 µm and less than or equal to 1.3 µm.

A sixth aspect of the present disclosure may include any of the first through fifth aspects, wherein the spiral has an inner radius greater than or equal to 0.5 µm and less than or equal to 7.5 µm.

A seventh aspect of the present disclosure may include any of the first through sixth aspects, wherein each cladding element of the plurality of cladding elements comprises a cladding element central longitudinal axis parallel to the central longitudinal axis of the hollow-core optical fiber, and the spiral of each cladding element is on a cross-section of the cladding element perpendicular to the cladding element central longitudinal axis.

An eighth aspect of the present disclosure may include the seventh aspect, wherein an inner surface of the wound glass sheet and an adjacent outer surface of the same wound glass sheet are spaced apart by a distance greater than or equal to 1 µm less than or equal to 15 µm in a direction perpendicular to the cladding element central longitudinal axis.

A ninth aspect of the present disclosure may include the seventh aspect or the eighth aspect wherein, the wound glass sheet comprises a plurality of slots such that the wound glass sheet is discontinuous in a cross section of the hollow-core optical fiber perpendicular to the cladding element central longitudinal axis.

A tenth aspect of the present disclosure may include any of the seventh through ninth aspects, wherein the each of the plurality of slots extends in a direction parallel to the cladding element central longitudinal axis for a distance less than a length of the hollow-core optical fiber.

An eleventh aspect of the present disclosure may include any of the first through tenth aspects, wherein an inner end of the wound glass sheet is spaced apart from an inner surface of the wound glass sheet such that the spiral has an interior opening.

A twelfth aspect of the present disclosure may include any of the first through eleventh aspects, wherein an inner end of the wound glass sheet contacts an inner surface of the wound glass sheet such that the spiral has a closed interior.

A thirteenth aspect of the present disclosure may include any of the first through twelfth aspects, wherein an outer end of the wound glass sheet is spaced apart from an outer surface of the wound glass sheet such that the spiral has an exterior opening.

A fourteenth aspect of the present disclosure may include any of the first through thirteenth aspects, wherein an outer end of the wound glass sheet contacts an outer surface of the wound glass sheet such that the spiral has a closed exterior.

A fifteenth aspect of the present disclosure may include any of the first through fourteenth aspects, wherein each cladding element is spaced apart from adjacent cladding elements in a circumferential direction about the central longitudinal axis.

A sixteenth aspect of the present disclosure may include any of the first through fifteenth aspects, wherein each cladding element is spaced apart from adjacent cladding elements by a distance of less than or equal to 12 µm without contacting adjacent cladding elements.

A seventeenth aspect of the present disclosure may include any of the first through sixteenth aspects, wherein the wound glass sheet comprises silica-based glass.

An eighteenth aspect of the present disclosure may include any of the first through seventeenth aspects, wherein the substrate comprises silica-based glass.

A nineteenth aspect of the present disclosure may include any of the first through eighteenth aspects, wherein the hollow core comprises one or more gasses.

A twentieth aspect of the present disclosure may include any of the first through nineteenth aspects, wherein the hollow core consists essentially of air.

A twenty-first aspect of the present disclosure may include any of the first through twentieth aspects, wherein the hollow core has a diameter of less than or equal to 25 µm.

A twenty-second aspect of the present disclosure may include any of the first through twenty-first aspects, wherein the plurality of cladding elements are configured to provide an anti-resonant effect at the wavelength λ, the anti-resonant effect operable to confine an optical signal at the wavelength λ in the hollow core.

A twenty-third aspect of the present disclosure may include the twenty-second aspect, wherein the wavelength λ is greater than or equal to 350 nm and less than or equal to 12000 nm.

A twenty-fourth aspect of the present disclosure may include the twenty-second aspect or the twenty-third, wherein the plurality of cladding elements are configured such that a confinement loss of a fundamental mode of the optical signal propagating in the hollow-core optical fiber is less than or equal to $10^{-2}$ dB/km at the wavelength λ, wherein the wavelength λ is greater than or equal to 1200 nm and less than or equal to 1650 nm.

A twenty-fifth aspect of the present disclosure may include any of the twenty-second through twenty-fourth aspects, wherein the hollow-core optical fiber has a bending loss of a fundamental mode of an optical signal propagating in the hollow core of less than or equal to 1 dB/km at the wavelength λ for a bend radius of 3 cm to 20 cm, wherein the wavelength λ is greater than or equal to 1300 nm and less than or equal to 1700 nm.

A twenty-sixth aspect of the present disclosure may include any of the first through twenty-fifth aspects, wherein the hollow-core optical fiber is configured to provide single-mode operation at a wavelength of 1550 nm.

A twenty-seventh aspect of the present disclosure may include any of the first through twenty-sixth aspects, wherein the cladding elements further comprise a glass layer surrounding or partially surrounding the spiral, the glass layer contacting the inner surface of the substrate.

DETAILED DESCRIPTION

Figure 1:
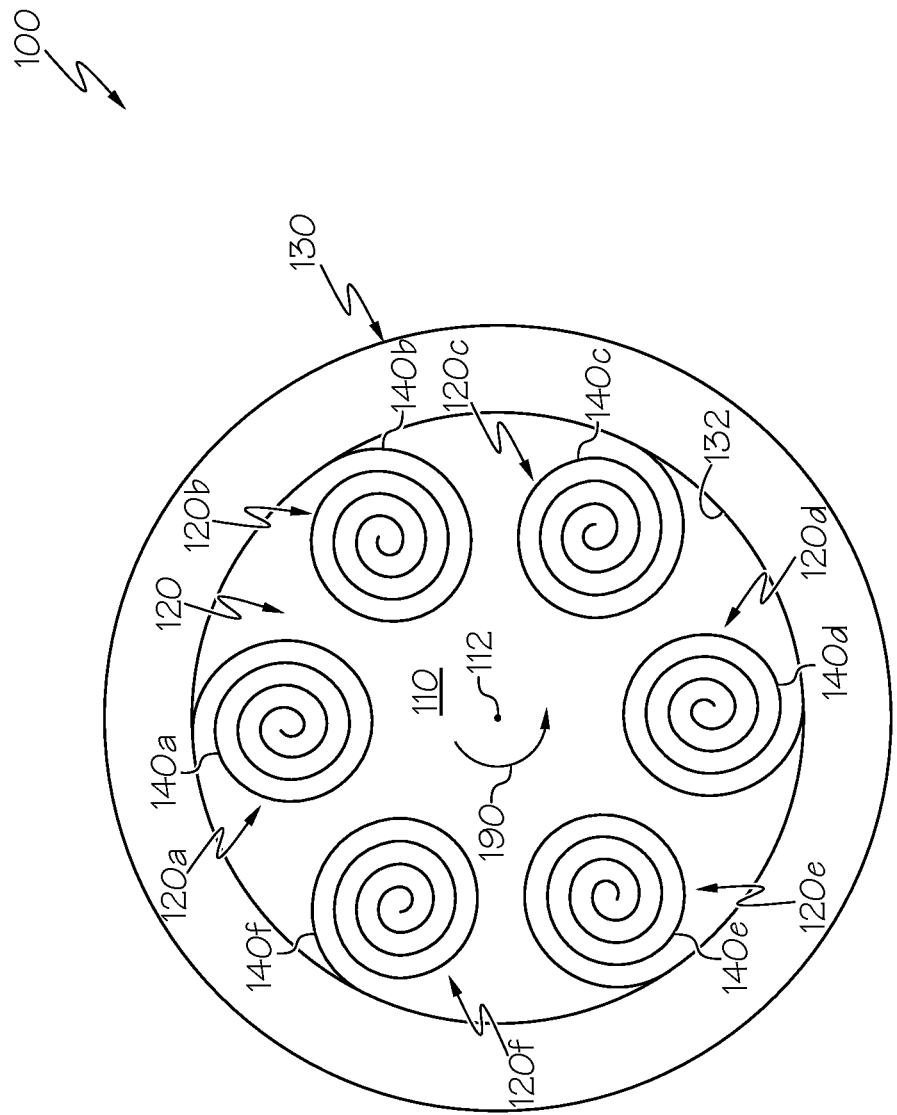
FIG. 1 schematically depicts a cross-sectional view of a hollow-core optical fiber according to one or more embodiments described herein.

Reference will now be made in detail to various embodiments of hollow-core optical fibers. Whenever possible, the same reference numerals will be used throughout the drawings to refer to the same or like parts. In embodiments, hollow-core optical fibers may comprise a substrate, a hollow core extending through the substrate, and a plurality of cladding elements positioned between the hollow core and the substrate. A cladding element may comprise a wound glass sheet configured as a spiral. Each of the plurality of cladding elements may contact an inner surface of the substrate. Embodiments, of the hollow-core optical fibers will be described in further detail herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Various components described herein may be referred to as "directly connected" or "indirectly connected". Components are directly connected when they are joined to one another with no intervening structure. Components may be joined by fusing, welding, adhesives, or any other suitable attachment means. Components are "indirectly connected" when they are joined to one another with intervening structure. Examples of intervening structure include welding aids (e.g. frits, solders, fluxes), adhesives, and bonding materials. In embodiments, components connected indirectly are connected only by a welding aid, adhesive, or bonding material. The term "connected" means "directly connected" or "indirectly connected". Components "directly connected" to one another are said to be in direct contact with each other. Components "indirectly connected" to one another are said to be in indirect contact with each other. Components "connected" to one another are in direct or indirect contact with each other.

As used herein, the singular forms "a," "an" and "the" include plural referents unless the context clearly dictates otherwise. Thus, for example, reference to "a" component includes aspects having two or more such components, unless the context clearly indicates otherwise.

Without intending to be bound by theory, an optical signal (i.e., light) may be passed through the hollow core of a hollow-core optical fiber. As used herein, "attenuation" refers to the reduction of intensity of the optical signal passing through the hollow-core optical fiber. Attenuation of the optical signal being guided through the hollow-core optical fiber may be reduced by various effects, including but not limited to, an anti-resonant effect and an inhibited coupling mechanism. Each of these effects may reduce the leakage of light from the hollow core of the optical fiber to the cladding elements of the optical fiber, which in turn reduces the attenuation of the optical signal propagating in the hollow core. Said differently, each of these effects may improve the confinement of light to the hollow core of the optical fiber, thereby reducing the attenuation of the optical signal propagating in the hollow core. Embodiments of hollow-core optical fibers described herein may comprise structures that utilize one or more of these effects to reduce the attenuation of an optical signal passing through the hollow-core optical fiber.

As used herein, "anti-resonance" or an "anti-resonant effect" refers to an effect that occurs when the thickness of a material (e.g. the material used to form cladding elements) is proportional to a wavelength of light passing through the hollow-core optical fiber such that the light passing through the hollow-core optical fiber is confined to the hollow core. Without intending to be bound by theory, an anti-resonant effect occurs when the thickness of a material satisfies the quarter-wave condition (phase accumulated on a single pass is one quarter of $2\pi$, and any odd multiple of a quarter wave). When this condition is applied to the thickness of the material, light is confined to the hollow core with minimum leakage to the cladding. In other words, this condition helps inhibit coupling between core modes and cladding modes, resulting in low loss of transmission and increased confinement of the optical signal in the hollow core. The anti-resonant effect may, in one embodiment, be satisfied by a material having a thickness given by Equation 1:

$$t_{AR} = \frac{(2m-1)\lambda}{4\sqrt{n^2-1}} \quad \text{Equation 1}$$

In Equation 1, $t_{AR}$ is the thickness of the material that satisfies the anti-resonance condition, $\lambda$ is the wavelength of the optical signal (core mode), m is an integer that is greater than or equal to 1, and n is the refractive index of the material. It should be noted that Equation 1 represents an ideal thickness of a material that would satisfy the anti-resonant effect, and that material thicknesses that are not exactly equal to $t_{AR}$ may also provide increased confinement of light to the hollow core. For example, without limitation, it is contemplated that a material having a thickness within 10% of $t_{AR}$ (from 90% $t_{AR}$ to 110% $t_{AR}$) may be operable to confine or substantially confine light to the hollow core.

As used herein, an "inhibited coupling mechanism" refers to an effect that occurs when cladding elements having negative curvature inhibit coupling between core modes and cladding modes to reduce light leakage from the hollow core. As used herein, "negative curvature" refers to cladding elements having a surface with a convex shape facing the central longitudinal axis of the hollow-core optical fiber. Without intending to be bound by theory, using cladding elements having a surface with a convex shape facing the central longitudinal axis of the hollow-core optical fiber may reduce the amount of light that contacts the cladding elements and may also reduce the light leaking through the cladding elements and the gaps between these cladding elements. In turn, this may reduce attenuation of the optical signal due to the leaking through the cladding elements and the gaps between them and may also reduce light scattering that may occur when light contacts the surface of the cladding elements.

Referring now to FIG. 1, a hollow-core optical fiber 100 may comprise a substrate 130. The substrate 130 may comprise a tubular shape and an inner surface 132 surrounding a central longitudinal axis 112 of the hollow-core optical fiber 100. The hollow-core optical fiber 100 may comprise a hollow core 110. The hollow core 110 may extend through the substrate 130 along the central longitudinal axis 112 of the hollow-core optical fiber 100. Generally, the hollow core 110 is the light-guiding portion of the hollow-core optical fiber 100. The hollow-core optical fiber 100 may comprise a plurality of cladding elements 120 (i.e., cladding elements 120a, 120b, 120c, 120d, 120e, and 120f in the embodiment depicted in FIG. 1, generally referred to herein as cladding elements 120). The plurality of cladding elements 120 may be operable to prevent the leakage of light out of the hollow core 110, generally, by causing destructive interference of light passing through the cladding elements, resulting in light propagating in the hollow core 110.

The hollow core 110 has a radius that extends in an orthogonal direction from the central longitudinal axis 112 to the closest point of contact with one of the plurality of cladding elements 120. The diameter of the hollow core 110 is twice the radius of the hollow core 110. In embodiments, the hollow core 110 has a diameter greater than or equal to 3 µm and less than or equal to 60 µm. For example, without limitation, the hollow core 110 may have a diameter from 3 µm to 60 µm, from 5 µm to 60 µm, from 10 µm to 60 µm, from 15 µm to 60 µm, from 20 µm to 60 µm, from 25 µm to 60 µm, from 30 µm to 60 µm, from 35 µm to 60 µm, from 40 µm to 60 µm, from 45 µm to 60 µm, from 50 µm to 60 µm, from 55 µm to 60 µm, from 3 µm to 55 µm, from 3 µm to 50 µm, from 3 µm to 45 µm, from 3 µm to 40 µm, from 3 µm to 35 µm, from 3 µm to 30 µm, from 3 µm to 25 µm, from 3 µm to 20 µm, from 3 µm to 15 µm, from 3 µm to 10 µm, or any range or combination of ranges formed from these endpoints. In some embodiments, the diameter of the hollow core 110 may be from 3 µm to 30 µm, from 3 µm to 25 µm, from 5 µm to 20 µm, or even from 5 µm to 10 µm.

The hollow-core optical fiber 100 can be configured to transmit a single mode or multiple modes of light at a particular wavelength by controlling the diameter of hollow core 110. Without intending to be bound by theory, it is believed that single-mode operation occurs when the diameter of hollow core 110 is small and few-mode or multimode operation occurs as the diameter of hollow core 110 increases. The diameters defining single-mode, few-mode and multimode operation depend on the wavelength of the optical signal transmitted by hollow-core optical fiber 100. Without intending to be bound by theory, at a wavelength of 1550 nm, when the diameter of the hollow core 110 is less than or equal to about 25 µm (such as from 3 µm to about 25 µm, or from 5 µm to 24 µm, or from 7 µm to 22 µm, or from 9 µm to 20 µm), the hollow-core optical fiber 100 may be operable to transmit a single mode of light through the hollow core 110. Hollow-core optical fibers 100 configured to transmit a single mode of light may have low confinement loss and bending loss and may be suitable for use in long-distance communication. When the diameter of the hollow core 110 is greater than about 25 µm (such as greater than 27 µm, or greater than 30 µm, or greater than 40 µm, or greater than 50 µm, or in a range from 30 µm to 60 µm), the hollow-core optical fiber 100 may be operable to transmit few or multiple modes of light at a wavelength of 1550 nm. The hollow-core optical fiber 100 can thus be configured to provide single-mode, few-mode, or multimode operation at a wavelength of 1550 nm.

In embodiments, the substrate 130 may comprise a tubular shape comprising an inner surface 132 surrounding the central longitudinal axis 112 of the hollow-core optical fiber 100. The substrate 130 supports any cladding elements included in the hollow-core optical fiber 100. In embodiments, the outer diameter of the substrate 130 may be from 100 µm to 500 µm. For example, without limitation, the outer diameter of the substrate 130 may be from 100 µm to 500 µm, from 200 µm to 500 µm, from 300 µm to 500 µm, from 400 µm to 500 µm, from 100 µm to 400 µm, from 100 µm to 300 µm, from 100 µm to 200 µm, or any combination or subset of these ranges. In embodiments, the outer diameter of the substrate may be from 100 µm to 250 µm. In embodiments, the wall thickness of the substrate (i.e., the difference between the inner diameter of the substrate and the outer diameter of the substrate) may be from 20 µm to 500 µm. For example, without limitation, the wall thickness of the substrate may be from 20 µm to 500 µm, from 100 µm to 500 µm, from 200 µm to 500 µm, from 300 µm to 500 µm, from 400 µm to 500 µm, from 20 µm to 400 µm, from 20 µm to 300 µm, from 20 µm to 200 µm, from 20 µm to 100 µm, or any combination or subset of these ranges.

In embodiments, one or more protective coatings (not depicted) may be positioned on an exterior surface of the substrate 130. These coatings may be, for example, organic materials, such as plastics or polymers, and may protect the hollow-core optical fiber 100 from the physical environment. The coatings may include a primary coating with a low Young's modulus (e.g. <1 MPa) surrounding and adjacent to the substrate 130 and a secondary coating with a high Young's modulus (e.g. >1000 MPa) surrounding and adjacent to the primary coating. Representative materials for primary and secondary coatings include acrylate materials (e.g. urethane acrylates). In embodiments, a coated hollow-core optical fiber may have an outer diameter of less than or equal to 242 microns, less than or equal to 200 microns, less than or equal to 190 microns, in a range from 170 microns to 242 microns, or in a range from 180 microns to 220 microns. In embodiments the thickness of the primary coating in a radial direction is greater than 10 microns, or greater than 15 microns, or greater than 20 microns, or less than 45 microns, or less than 40 microns, or less than 35 microns, or in a range from 10 microns to 45 microns, or in a range from 15 microns to 40 microns, or in a range from 20 microns to 35 microns. In embodiments the thickness of the secondary coating in a radial direction is greater than 10 microns, or greater than 15 microns, or greater than 20 microns, or less than 45 microns, or less than 40 microns, or less than 35 microns, or in a range from 10 microns to 45 microns, or in a range from 15 microns to 40 microns, or in a range from 20 microns to 35 microns.

In embodiments, each of the plurality of cladding elements 120 may extend in a direction parallel to the central longitudinal axis 112 of the hollow-core optical fiber 100. In embodiments, each of the plurality of cladding elements 120 comprises a wound glass sheet 140 configured as a spiral. The plurality of cladding elements 120 may be positioned between the central longitudinal axis 112 of the hollow-core optical fiber 100 and the inner surface 132 of the substrate 130. In embodiments, each of the plurality of cladding elements 120 contacts the inner surface 132 of the substrate 130. In one or more embodiments, each of the plurality of cladding elements 120 directly contacts the inner surface 132 of the substrate 130, such as when each wound glass sheet 140 is set against, fused to, or otherwise joined to the inner surface 132 of the substrate 130.

In embodiments, the hollow-core optical fiber 100 comprises greater than or equal to 3 cladding elements 120 and less than or equal to 11 cladding elements 120. For example, without limitation, the hollow-core optical fiber may 100 may comprise 3, 4, 5, 6, 7, 8, 9, 10, or 11 cladding elements 120. In some embodiments, the hollow-core optical fiber comprises 3, 4, or 5 cladding elements. In some embodiments, the hollow-core optical fiber 100 comprises 5 or 6 cladding elements 120. For example, the embodiment depicted in FIG. 1 includes 6 cladding elements 120.

Each cladding element 120 may be spaced apart from adjacent cladding elements 120 in a circumferential direction 120 about central longitudinal axis 112. That is, each cladding element 120 in the hollow-core optical fiber 100 may not be in contact with another cladding element 120 in the plurality of cladding elements 120. For example, according to the embodiment depicted in FIG. 1, cladding element 120a and cladding element 120f are spaced apart in a circumferential direction 120 such that cladding element 120a and cladding element 120f are not in contact with each other. Without intending to be bound by theory, when cladding elements 120 are in direct contact, the points at which the cladding elements 120 are in direct contact may have a thickness that is outside the range of thicknesses that promote confinement of an optical signal in the hollow core 110 through the anti-resonant effect. Accordingly, direct contact between cladding elements 120 may reduce the confinement of light in the hollow core 110 of the hollow-core optical fiber 100. In embodiments, cladding elements 120 are equally spaced about the central longitudinal axis 112 in a circumferential direction 190. In the embodiment depicted in FIG. 1, the six cladding elements 120 are equally spaced by 60 degrees in a circumferential direction 190.

Each cladding element 120 may be spaced apart from adjacent cladding elements 120 by a distance of less than or equal to 12 µm without contacting the adjacent cladding elements 120. As described herein, the distance by which two adjacent cladding elements are spaced apart is the shortest distance between the exterior surfaces of the adjacent cladding elements. For example, without limitation, each cladding element 120 may be spaced apart from adjacent cladding elements 120 by a distance of less than or equal to 12 µm, less than or equal to 11 µm, less than or equal to 10 µm, less than or equal to 9 µm, less than or equal to 8 µm, less than or equal to 7 µm, less than or equal to 6 µm, less than or equal to 5 µm, less than or equal to 4 µm, less than or equal to 3 µm, less than or equal to 2 µm, or less than or equal to 1 µm, without contacting. In some embodiments, the spacing between adjacent cladding elements 120 is uniform in the circumferential direction 190. In some embodiments, each cladding element 120 may be spaced apart from adjacent cladding elements 120 by a distance of less than or equal to 6 μm. Without intending to be bound by theory, reducing the distance between the cladding elements 120 may reduce attenuation of an optical signal passing through the hollow-core optical fiber 100. In embodiments, if the distance between the cladding elements 120 is too large (i.e., greater than 6 μm) light may leak out of the hollow core 110 through the gaps between the cladding elements 120, reducing the strength of the optical signal. Positioning the cladding elements 120 so the distance between the cladding elements 120 is less than or equal to 12 μm, without contacting, may minimize such losses.

Figure 2:
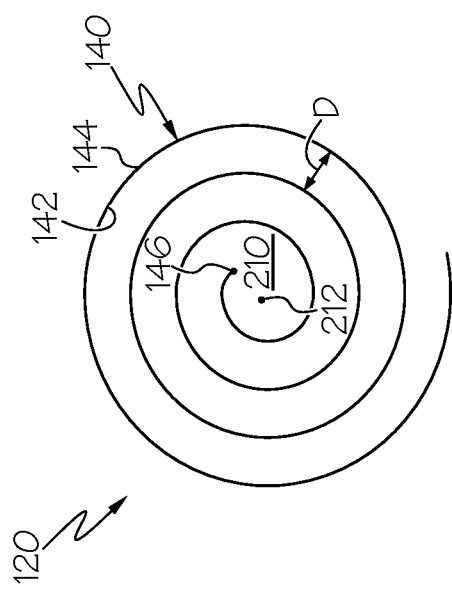
FIG. 2 schematically depicts a cross-sectional view of a cladding element of the hollow-core optical fiber according to one or more embodiments described herein.

Still referring to FIG. 1, each of the plurality of cladding elements 120 comprises a wound glass sheet 140 configured as a spiral (i.e., wound glass sheets 140a, 140b, 140c, 140d, 140e, and 140f in the embodiment of FIG. 1). FIG. 2 depicts an embodiment of a cladding element 120. Referring now to FIG. 2, the wound glass sheet 140 may comprise an inner surface 142 and an outer surface 144, where for each turn of would glass sheet 140 about cladding element central longitudinal axis 212, inner surface 142 faces cladding element central longitudinal axis 212 and outer surface 144 faces away from cladding element central longitudinal axis 212. As described herein, a thickness of the wound glass sheet 140 refers to the distance between the inner surface 142 of the wound glass sheet 140 and the outer surface 144 of the wound glass sheet 140. In embodiments, the wound glass sheet 140 may have a thickness of greater than or equal to 0.1 μm and less than or equal to 4.0 μm. For example, without limitation, the wound glass sheet 140 may have a thickness from 0.1 μm to 4.0 μm, from 0.3 μm to 4.0 μm, from 0.5 μm to 4.0 μm, from 0.7 μm to 4.0 μm, from 0.9 μm to 4.0 μm, from 1.1 μm to 4.0 μm, from 1.3 μm to 4.0 μm, from 1.5 μm to 4.0 μm, from 1.7 μm to 4.0 μm, from 1.9 μm to 4.0 μm, from 2.1 μm to 4.0 μm, from 2.3 μm to 4.0 μm, from 2.5 μm to 4.0 μm, from 2.7 μm to 4.0 μm, from 2.9 μm to 4.0 μm, from 3.1 μm to 4.0 μm, from 3.3 μm to 4.0 μm, from 3.5 μm to 4.0 μm, from 3.7 μm to 4.0 μm, from 3.9 μm to 4.0 μm, from 0.1 μm to 3.8 μm, from 0.1 μm to 3.6 μm, from 0.1 μm to 3.4 μm, from 0.1 μm to 3.2 μm, from 0.1 μm to 3.0 μm, from 0.1 μm to 2.8 μm, from 0.1 μm to 2.6 μm, from 0.1 μm to 2.4 μm, from 0.1 μm to 2.2 μm, from 0.1 μm to 1.0 μm, from 0.1 μm to 1.8 μm, from 0.1 μm to 1.6 μm, from 0.1 μm to 1.4 μm, from 0.1 μm to 1.2 μm, from 0.1 μm to 1.0 μm, from 0.1 μm to 0.8 μm, from 0.1 μm to 0.6 μm, from 0.1 μm to 0.4 μm, from 0.1 μm to 0.2 μm, or any range or combination of ranges formed from these endpoints. In embodiments, the wound glass sheet 140 may have a thickness of greater than or equal to 0.4 μm and less than or equal to 0.6 μm. In embodiments, the wound glass sheet 140 may have a thickness (i.e., a thickness as measured from the inner surface 142 to the outer surface 144), such as a thickness according to Equation 1, that promotes confinement of the optical signal in hollow core 110 through an anti-resonant effect. Without intending to be bound by theory, when each wound glass sheet 140 has a thickness that provides an anti-resonant effect, attenuation of an optical signal passing through the hollow-core optical fiber 100 may be reduced.

In embodiments, the wound glass sheet 140 is configured as a spiral and the spiral comprises greater than or equal to 2 and less than or equal to 12 turns. For example, without limitation, the wound glass sheet 140 configured as a spiral may comprise 2, 3, 4, 5, 6, 7, 8, 9, 10, 11, or 12 turns. As used herein, "turn" refers to the number of convex (as perceived by a viewer situated at central longitudinal axis 112) surfaces positioned between cladding element central longitudinal axis 212 and central longitudinal axis 112. Without intending to be bound by theory, as the number of turns in the spiral increases the number of convex surfaces facing the hollow core 110 of the fiber also increases. This may improve the ability of the spiral to confine an optical signal to the hollow core 110 of the fiber by an inhibited coupling mechanism or negative curvature effect. Additionally, as the number of turns in the spiral increases, the number of layers having a thickness that satisfies the anti-resonant effect increases. This may improve the ability of the spiral to confine an optical signal to the hollow core of the fiber by the anti-resonant effect.

In embodiments, the wound glass sheet 140 is configured as a spiral and the spiral comprises an inner radius greater than or equal to 0.5 μm and less than or equal to 7.5 μm. For example, without limitation, the wound glass sheet 140 may be configured as a spiral and the spiral may comprise an inner radius greater from 0.5 μm to 7.5 μm, from 1 μm to 7.5 μm, from 1.5 μm to 7.5 μm, from 2 μm to 7.5 μm, from 2.5 μm to 7.5 μm, from 3 μm to 7.5 μm, from 3.5 μm to 7.5 μm, from 4 μm to 7.5 μm, from 4.5 μm to 7.5 μm, 5 μm to 7.5 μm, 5.5 μm to 7.5 μm, 6 μm to 7.5 μm, 6.5 μm to 7.5 μm, 7 μm to 7.5 μm, 0.5 μm to 7 μm, 0.5 μm to 6.5 μm, 0.5 μm to 6 μm, 0.5 μm to 5.5 μm, 0.5 μm to 5 μm, from 0.5 μm to 4.5 μm, from 0.5 μm to 4 μm, from 0.5 μm to 3.5 μm, from 0.5 μm to 3 μm, from 0.5 μm to 2.5 μm, from 0.5 μm to 2 μm, from 0.5 μm to 1.5 μm, from 0.5 μm to 1 μm, or any range or combination of ranges formed from these endpoints. In some embodiments, the inner radius of the spiral may be less than or equal to 4 μm or less than or equal to 3.5 μm. In one or more embodiments, the inner radius of the spiral may be from 2.5 μm to 4 μm. As described herein, the "inner radius" of a spiral refers to the shortest distance between the inner end 146 of the wound glass sheet 140 and the cladding central longitudinal axis 212 in a plane perpendicular to the cladding element central longitudinal axis 212. Without intending to be bound by theory, if the inner radius of the spiral is too large, for example, greater than 7.5 μm, then additional modes may travel through the space defined by the inner cavity of each wound glass sheet 140. This may increase the confinement loss of the hollow-core optical fiber 100.

Still referring to FIG. 2, a cladding element 120 may comprise a cladding element central longitudinal axis 212. The cladding element central longitudinal axis may be parallel to the central longitudinal axis 112 of the hollow-core optical fiber 100 (FIG. 1). In embodiments, the spiral of the cladding element 120 is on a cross-section of the cladding element 120 that is perpendicular to the cladding element central longitudinal axis 212.

In embodiments, an inner surface 142 of the wound glass sheet 140 and an adjacent outer surface 144 of the same wound glass sheet 140 may be spaced apart by a distance D greater than or equal to 1 μm and less than or equal to 15 μm in a direction perpendicular to and passing through the cladding element central longitudinal axis 212. For example, without limitation, an inner surface 142 of the wound glass sheet 140 and an adjacent outer surface 144 of the wound glass sheet 140 may be spaced apart in a direction perpendicular to and passing through the cladding element central longitudinal axis 212 by a distance D from 1 μm to 15 μm, from 2 μm to 15 μm, from 3 μm to 15 μm, from 4 μm to 15 μm, from 5 μm to 15 μm, from 6 μm to 15 μm, from 7 μm to 15 μm, from 8 μm to 15 μm, from 9 μm to 15 μm, 10 μm to 15 μm, 11 μm to 15 μm, 12 μm to 15 μm, 13 μm to 15 μm, 14 μm to 15 μm, 1 μm to 14 μm, 1 μm to 13 μm, 1 μm to 12 μm, 1 μm to 11 μm, 1 μm to 10 μm, from 1 μm to 9 μm, from 1 μm to 8 μm, from 1 μm to 7 μm, from 1 μm to 6 μm, from 1 μm to 5 μm, from 1 μm to 4 μm, from 1 μm to 3 μm, from 1 μm to 2 μm, or any range or combination of ranges formed from these endpoints. In some embodiments, the distance D may be from 4 μm to 11 μm.

In embodiments, each wound glass sheet may have an interior opening or a closed interior and an exterior opening or a closed exterior. Still referring to FIG. 2, in embodiments, an inner end 146 of the wound glass sheet 140 may be spaced apart from the inner surface 142 of the wound glass sheet 140 such that the spiral has an interior opening 210. Without intending to be bound by theory, when an inner end 146 of the wound glass sheet contacts an inner surface 142 of the wound glass sheet 140, the point at which the inner end 146 and the inner surface 142 contact may have a thickness that is outside the range of thicknesses that promote confinement of an optical signal in the hollow core 110 through the anti-resonant effect. Accordingly, spacing the inner end 146 of the wound glass sheet 140 apart from the inner surface 142 of the wound glass sheet 140 may improve the confinement of an optical signal to the hollow core 110 of the hollow-core optical fiber 100.

Figure 3:
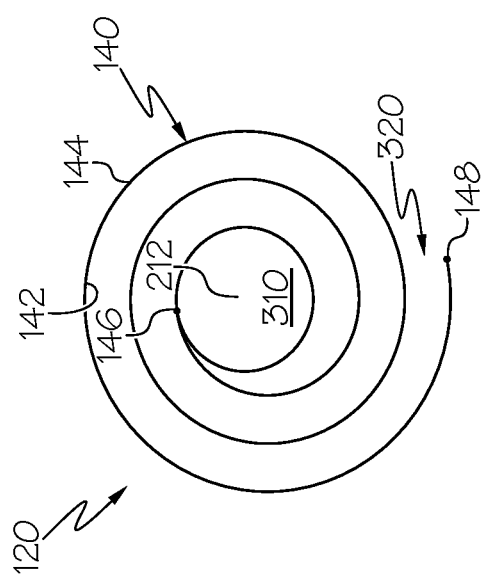
FIG. 3 schematically depicts a cross-sectional view of a cladding element of the hollow-core optical fiber according to one or more embodiments described herein.

Referring now to FIG. 3, in embodiments, an inner end 146 of the wound glass sheet 140 may contact an inner surface 142 of the wound glass sheet 140 such that the spiral has a closed interior 310. Without intending to be bound by theory, when an inner end 146 of the wound glass sheet 140 contacts an inner surface 142 of the wound glass sheet 140 the structure of the wound glass sheet 140 may be strengthened. Accordingly, closing the interior of the wound glass sheet 140 may improve the durability of the cladding elements 120 and the hollow-core optical fiber 100.

Still referring to FIG. 3, in embodiments, an outer end 148 of the wound glass sheet 140 may be spaced apart from the outer surface 144 of the wound glass sheet 140 such that the spiral has an exterior opening 320. Without intending to be bound by theory, when an outer end 148 of the wound glass sheet contacts an outer surface 144 of the wound glass sheet 140, the point at which the outer end 148 and the outer surface 144 contact may have a thickness that is outside the range of thicknesses that promote confinement of an optical signal in the hollow core 110 through the anti-resonant effect. Accordingly, spacing the outer end 148 of the wound glass sheet 140 apart from the outer surface 144 of the wound glass sheet 140 may improve the confinement of an optical signal to the hollow core 110 of the hollow-core optical fiber 100.

Figure 4:
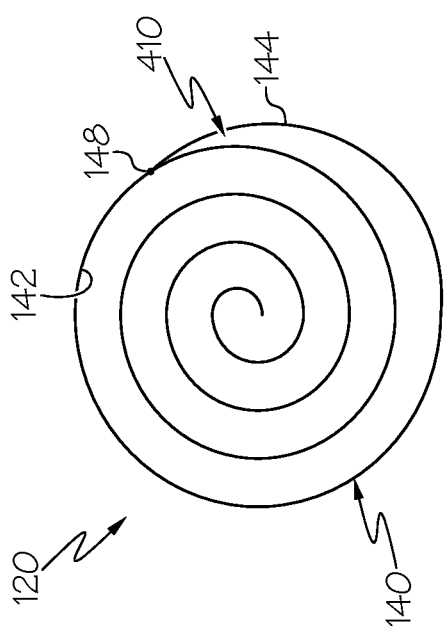
FIG. 4 schematically depicts a cross-sectional view of a cladding element of the hollow-core optical fiber according to one or more embodiments described herein.

Referring now to FIG. 4, in embodiments, an outer end 148 of the wound glass sheet 140 may contact an outer surface 144 of the wound glass sheet 140 such that the spiral has a closed exterior 410. Without intending to be bound by theory, when an outer end 148 of the wound glass sheet 140 contacts an outer surface 144 of the wound glass sheet 140 the structure of the wound glass sheet 140 may be strengthened. Accordingly, closing the exterior of the wound glass sheet 140 may improve the durability of the cladding elements 120 and the hollow-core optical fiber 100.

Figure 5:
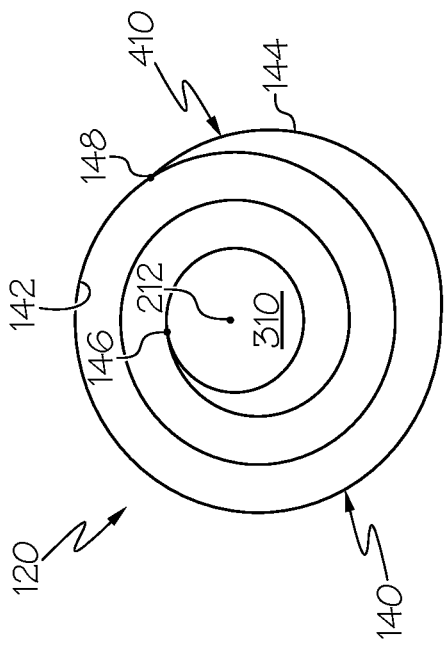
FIG. 5 schematically depicts a cross-sectional view of a cladding element of the hollow-core optical fiber according to one or more embodiments described herein.

Referring now to FIG. 5, in some embodiments, an inner end 146 of the wound glass sheet 140 may contact an inner surface 142 of the wound glass sheet 140 such that the spiral has a closed interior 310, and an outer end 148 of the wound glass sheet 140 may contact an outer surface 144 of the wound glass sheet 140 such that the spiral has a closed exterior 410. Without intending to be bound by theory, closing both the interior and the exterior of the wound glass sheet 140 may improve the strength of the wound glass sheet 140, improving the durability of the cladding elements 120 and the hollow-core optical fiber 100.

It is contemplated that the wound glass sheets 140 described herein may have any combination of interior opening 210, closed interior 310, exterior opening 320 and closed exterior 410. For example, a wound glass sheet 140 may have an interior opening 210 and an exterior opening 320. A wound glass sheet 140 may have an interior opening 210 and a closed exterior 410. A wound glass sheet 140 may have a closed interior 310 and an exterior opening 320. A wound glass sheet 140 may have a closed interior 310 and a closed exterior 410. In embodiments, the cladding elements 120 of the hollow-core optical fiber 100 may comprise wound glass sheets 140 with any combination of opening configurations. In embodiments, each cladding element 120 may have the same opening configuration.

Figure 6:
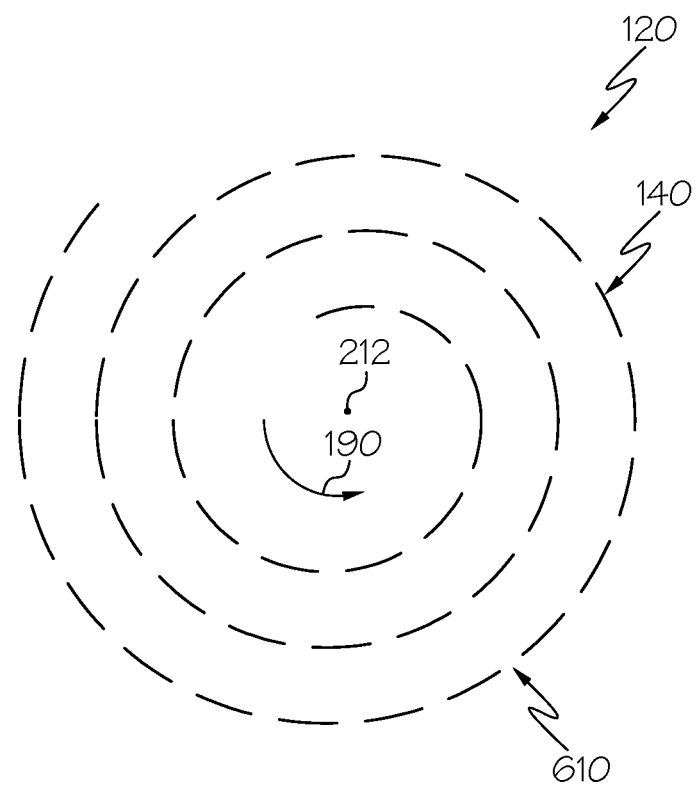
FIG. 6 schematically depicts a cross-sectional view of a cladding element of the hollow-core optical fiber according to one or more embodiments described herein.

Referring now to FIG. 6, in some embodiments, the wound glass sheet 140 comprises a plurality of slots 610 such that the wound glass sheet 140 is discontinuous in a cross section of the cladding element 120 perpendicular to the cladding element central longitudinal axis 212. Each of the plurality of slots 610 may extend in a direction parallel to the cladding element central longitudinal axis 212 for a distance less than a length of the hollow core optical fiber 100. In embodiments, each slot may have a width greater than or equal to 1 μm and less than or equal to 7 μm. As described herein the width of a slot refers to the distance that a slot extends in a circumferential direction 190 in a plane perpendicular to the cladding element central longitudinal axis 212. For example, without limitation, each slot may have a width from 1 μm to 7 μm, from 1.5 μm to 7 μm, from 2.5 μm to 7 μm, from 3.5 μm to 7 μm, from 4.5 μm to 7 μm, from 5.5 μm to 7 μm, from 6.5 μm to 7 μm, from 1 μm to 6 μm, from 1 μm to 5 μm, from 1 μm to 4 μm, from 1 μm to 3 μm, from 1 μm to 2 μm, or any range or combination of ranges formed from these endpoints. In some embodiments, each slot may have a width from 1 μm to 2.4 μm. Without intending to be bound by theory, the inclusion of a plurality of slots 610 in the wound glass sheet 140 may reduce the confinement loss of an optical signal propagating in the hollow core 110 of the hollow-core optical fiber 100. Confinement loss may be reduced by slots that are comparable in width or slightly smaller than the operation wavelength (i.e., greater than 1 μm). However, light may leak from the hollow core 110 if the slots are too wide (i.e., wider than 7 μm).

In embodiments, adjacent slots on the wound glass sheet 140 may be spaced apart from one another in a circumferential direction 190 As described herein, slots are adjacent when a single portion of the wound glass sheet 140 is positioned between the slots in a cross section of the wound glass sheet 140 perpendicular to the cladding element central longitudinal axis 212. In embodiments, adjacent slots may be spaced apart by a distance in a circumferential direction 190 of greater than or equal to 5 μm and less than or equal to 40 μm. For example, without limitation, adjacent slots may be spaced apart from one another in a circumferential direction 190 by a distance from 5 μm to 40 μm, from 10 μm to 40 μm, from 15 μm to 40 μm, from 20 μm to 40 μm, from 25 μm to 40 μm, from 30 μm to 40 μm, from 35 μm to 40 μm, from 5 μm to 35 μm, from 5 μm to 30 μm, from 5 μm to 25 μm, from 5 μm to 20 μm, from 5 μm to 15 μm, from 5 μm to 10 μm, or any range or combination of ranges formed from these endpoints. In some embodiments, adjacent slots may be spaced apart from one another in a circumferential direction 190 by a distance from 10 μm to 25 μm. Without intending to be bound by theory, if the spacing between adjacent slots is too small (i.e., less than 5 µm) then the cladding element may be mechanically weak, as the wound glass sheet 140 would include very long, thin strips of glass separated by slots of comparable dimensions. Additionally, if the spacing between adjacent slots is too small (i.e., less than 5 µm) then negative interference may result in the attenuation of an optical signal propagating in the hollow-core optical fiber 100. If the spacing between the slots is too great (i.e., greater than 40 µm), then there may be too few slots on each turn of the wound glass sheet 140 for the hollow-core optical fiber 100 to benefit from the presence of the slots in the cladding element.

In embodiments, each wound glass sheet 140 may be connected to the inner surface 132 of the substrate 130. In some embodiments, the outer surface 144 of the wound glass sheet 140 may contact the inner surface 132 of the substrate 130. In some embodiments, the outer end 148 of the wound glass sheet 140 may contact the inner surface 132 of the substrate 130. In embodiments, both the outer end 148 of the wound glass sheet 140 and the outer surface 144 of the wound glass sheet 140 may contact the inner surface 132 of the substrate 130. In one or more embodiments, the outer surface 144 of the wound glass sheet 140 may contact the inner surface 132 of the substrate 130 at a point that is within 30° (as measured in the circumferential direction 190) of the outer end 148 of the wound glass sheet 140. For example, without limitation, the outer surface 144 of the wound glass sheet 140 may contact the inner surface 132 of the substrate 130 at a point (as measured in the circumferential direction 190) that is within 30°, 25°, 20°, 15°, 10°, 5°, or even 1° of the outer end 148 of the wound glass sheet 140. In such embodiments, an exterior opening 320 of the wound glass sheet 140 may be facing away from the hollow core 110.

Figure 8:
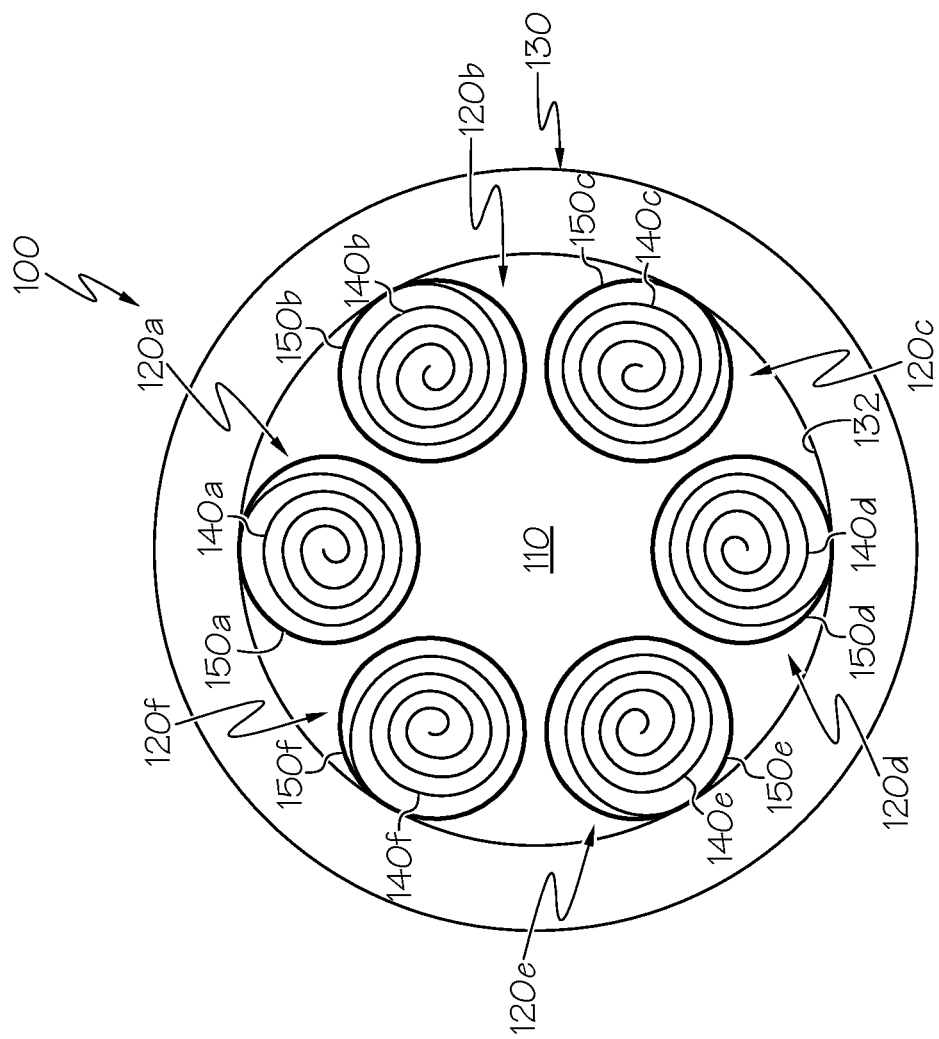
FIG. 8 schematically depicts a cross-sectional view of a hollow-core optical fiber according to one or more embodiments described herein.
Figure 7:
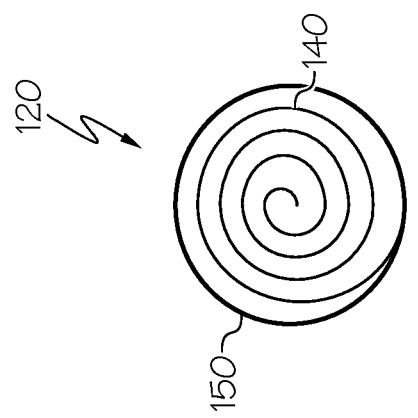
FIG. 7 schematically depicts a cross-sectional view of a cladding element of the hollow-core optical fiber according to one or more embodiments described herein.
Figure 10:
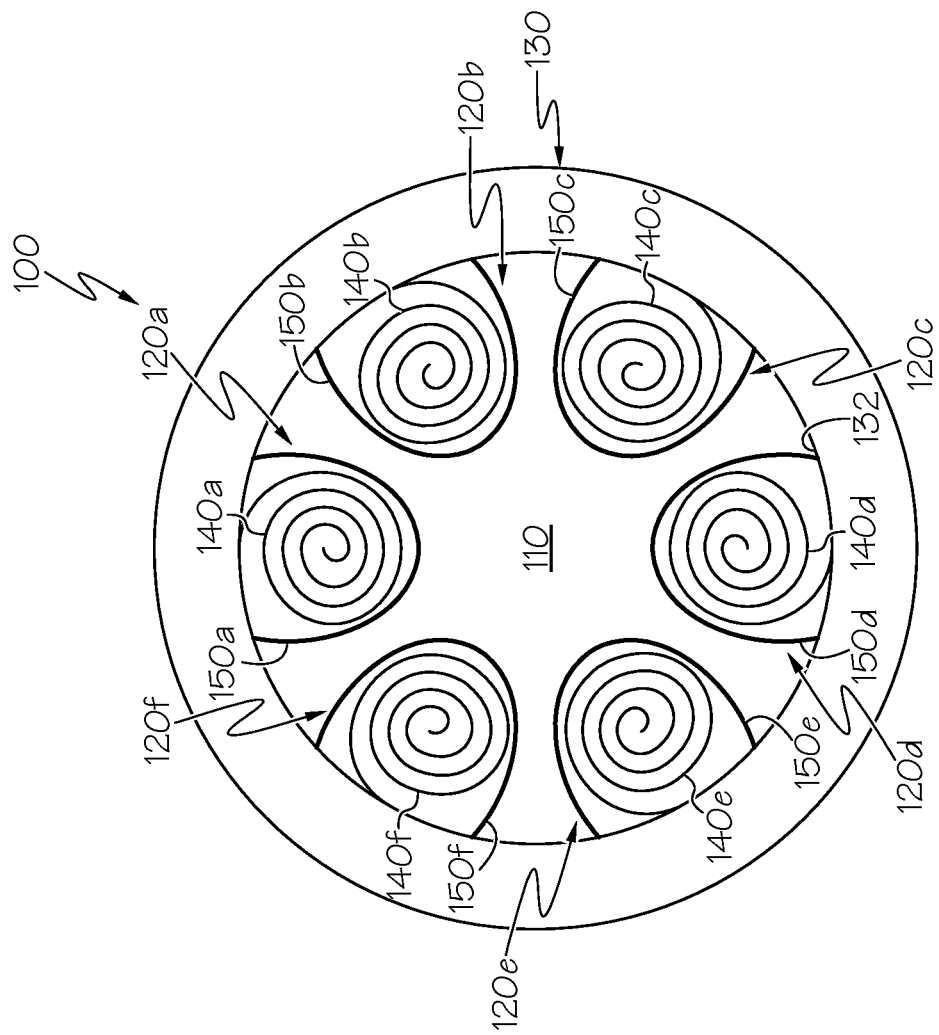
FIG. 10 schematically depicts a cross-sectional view of a hollow-core optical fiber according to one or more embodiments described herein.
Figure 9:
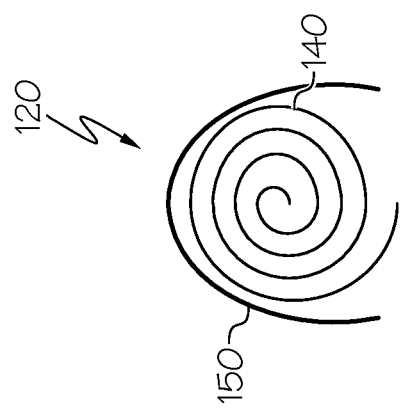
FIG. 9 schematically depicts a cross-sectional view of a cladding element of the hollow-core optical fiber according to one or more embodiments described herein.

Referring now to FIGS. 7-10, in some embodiments, the spiral defined by the wound glass sheet 140 of cladding element 120 is surrounded or partially surrounded by a glass layer 150. In FIG. 7, the spiral defined by wound glass sheet 140 of cladding element 120 is surrounded by a glass layer 15. FIG. 8 shows a hollow-core optical fiber 100 with a plurality of cladding elements 120, each of which includes a spiral defined by wound glass sheet 140 surrounded by a glass layer 150. In FIG. 9, the spiral defined by would glass sheet 140 of cladding element 120 is partially surrounded by a glass layer 150. FIG. 10 shows a hollow-core optical fiber 100 with a plurality of cladding elements 120, each of which includes a spiral defined by wound glass sheet 140 partially surrounded by a glass layer 150. In the embodiments depicted in FIGS. 8 and 10, the glass layer 150 contacts the inner surface 132 of the substrate 130. In embodiments in which the spiral defined by wound glass sheet 140 is partially surrounded by glass layer 150, wound glass sheet 140 may (as shown in FIG. 10) or may not (not shown) contact inner surface 132 of substrate 130.

In embodiments described herein, the wound glass sheet 140 may comprise silica-based glass. Silica based glass may include pure silica or silica that is doped with one or more dopants to modify the index of refraction of the silica. In embodiments, the wound glass sheet 140 of each of the plurality of cladding elements 120 may comprise silica-based glass. In embodiments, the wound glass sheet 140 of each of the plurality of the cladding elements may consist essential of or consist of silica-based glass. In embodiments, the substrate 130 may comprise silica-based glass. In embodiments, the substrate 130 may consist essentially of or consist of silica-based glass.

In embodiments, the hollow core 110 may comprise one or more gasses. In embodiments, the hollow core 110 may comprise one or more inert gasses. In embodiments, the hollow core 110 may comprise, consist essentially of, or consist of air.

In embodiments described herein, the plurality of cladding elements 120 may be configured to confine a fundamental mode of an optical signal (i.e., light) propagating in the hollow core 110 of the hollow-core optical fiber 100 by one or more of the anti-resonant effect and an inhibited coupling mechanism. In embodiments, the fundamental mode of the optical signal guided by the hollow core 110 may have a wavelength λ from 350 nm to 12000 nm. For example, without limitation, the fundamental mode of the optical signal guided by hollow core 110 may have a wavelength from 350 nm to 12000 nm, from 500 nm to 12000 nm, from 1000 nm to 12000 nm, from 1500 nm to 12000 nm, from 2000 nm to 12000 nm, from 2500 nm to 12000 nm, from 3000 nm to 12000 nm, from 3500 nm to 12000 nm, from 4000 nm to 12000 nm, from 4500 nm to 12000 nm, from 5000 nm to 12000 nm, from 5500 nm to 12000 nm, from 6000 nm to 12000 nm, from 6500 nm to 12000 nm, from 7000 nm to 12000 nm, from 7500 nm to 12000 nm, from 8000 nm to 12000 nm, from 9000 nm to 12000 nm, from 10000 nm to 12000 nm, from 11000 nm to 12000 nm, from 350 nm to 11000 nm, from 350 nm to 10000 nm, from 350 nm to 9000 nm, from 350 nm to 8000 nm, from 350 nm to 7500 nm, from 350 nm to 7000 nm, from 350 nm to 6500 nm, from 350 nm to 6000 nm, from 350 nm to 5500 nm, from 350 nm to 5000 nm, from 350 nm to 4500 nm, from 350 nm to 4000 nm, from 350 nm to 3500 nm, from 350 nm to 3000 nm, from 350 nm to 2500 nm, from 350 nm to 2000 nm, from 350 nm to 1500 nm, from 350 nm to 1000 nm, from 350 nm to 500 nm, or any combination or subset of these ranges. In embodiments, the wavelength λ may be from 1300 nm to 1700 nm, such as 1310 nm or 1550 nm. In embodiments, the plurality of cladding elements may be configured to provide an anti-resonant effect and/or an inhibited coupling mechanism at a wavelength from 350 nm to 12000 nm, the anti-resonant effect and/or inhibited coupling mechanism operable to confine an optical signal propagating in the hollow-core optical fiber 100 at a wavelength from 350 nm to 12000 nm in the hollow core 110.

Without intending to be bound by theory, confinement loss may be the dominant attenuation factor in the hollow-core optical fibers described herein. Confinement loss may occur as light leaks from the hollow core 110 to the cladding element 120. Confinement loss may be calculated using Equation 2 and Equation 3.

$$n_{eff} = n_r + i \cdot n_{im} \quad \text{Equation 2}$$

$$CL\left[\frac{dB}{km}\right] = \frac{20}{\ln(10)} \cdot \frac{2\pi}{\lambda} \cdot \text{Im}(n_{eff}) \cdot 10^3 \quad \text{Equation 3}$$

In Equations 2 and 3, $n_{eff}$ is the effective index of the mode with wavelength λ propagating in the hollow-core fiber with the real part of $n_r$ and the imaginary part of $n_{im}$. The wavelength is in the units of meters. The real part of the effective index is related to the propagation speed of the mode and the imaginary part is related to the confinement loss of the mode. For an anti-resonant hollow-core fiber with a given structure of the core and the cladding, the effective index may be determined using a fiber modeling tool, such COMSOL Multiphysics®. The confinement loss CL is calculated using Equation 3.

In embodiments, the plurality of cladding elements 120 are configured such that a minimum confinement loss of a fundamental mode of the optical signal propagating in the hollow-core optical fiber 100 is less than $10^{-2}$ dB/km at the wavelength λ of the fundamental mode guided by hollow core 110. For example, without limitation, the plurality of cladding elements 120 are configured such that a confinement loss of a fundamental mode of the optical signal propagating in the hollow core 110 of hollow-core optical fiber 100 at a wavelength λ may be less than $10^{-2}$ dB/km, less than $10^{-3}$ dB/km, or even less than $10^{-4}$ dB/km.

As described herein, "bending loss" refers to a difference between the attenuation of a hollow-core optical fiber in a bent configuration and a straight configuration. Without intending to be bound by theory, bending loss is the additional propagation loss caused by coupling light from core modes to cladding modes when the fiber is bent. A bend in a fiber may be described in terms of a bend radius or radius of curvature, which refers to the radius of a hypothetical circle (or arc) having the same curvature as the bend. Bending loss may be determined by using a mandrel wrap test. In this test method, light is launched into a test fiber with a portion wrapped on a mandrel of known bend radius R with one or more turns N and the output power P is measured first. Without disturbing the launch condition, the wrapped fiber portion is released to a straight condition and the output power $P_0$ is then measured. The bending loss of the fiber $\alpha_B$ is calculated using the Equation 4:

$$\alpha_B\left(\frac{dB}{turn}\right) = \frac{10\log(P_0/P)}{N} \quad \text{Equation 4}$$

In embodiments, the hollow-core optical fiber 100 has a minimum bending loss of a fundamental mode of an optical signal propagating in the hollow core of less than or equal to 1 dB/km at the wavelength λ for a bend radius of 3 cm to 20 cm. For example, without limitation, the hollow-core optical fiber 100 may have a minimum bending loss of less than or equal to 0.1 dB/km, 0.08 dB/km, 0.06 dB/km, 0.04 dB/km, 0.02 dB/km or 0.01 dB/km at a wavelength λ for a bend radius from 3 cm to 20 cm, 5 cm to 20 cm, 10 cm to 20 cm, 15 cm to 20 cm, 3 cm to 15 cm, 3 cm to 10 cm, or 3 cm to 5 cm.

Embodiments of the hollow-core optical fibers described herein may be made by the following method. The cladding elements may be formed by winding a glass sheet into a spiral. Some suitable methods for forming wound glass sheets are described in co-pending U.S. Provisional Patent Application Ser. No. 63/467,064 filed on May 17, 2023, the entire disclosure of which is incorporated by reference herein for all purposes. The cladding elements may be sleeved into a substrate in a desired arrangement. The cladding elements may be joined to the substrate and to each other, as desired, to form a preform assembly. The cladding elements and substrate may be joined by any suitable means, such as, but not limited to setting against, pressing, heating, fusing, welding, and adhesives. Techniques for welding include laser welding, flame welding, and plasma welding. The preform assembly may be redrawn into a fiber preform using conventional fiber redraw techniques. The fiber preform may then be drawn into optical fiber using conventional fiber drawing techniques.

EXAMPLES

The embodiments described herein will be further clarified by the following examples.

Example 1—Modeling Confinement Loss of a Hollow-Core Optical Fiber as a Function of Wavelength A hollow-core optical fiber 100 was modeled to determine the confinement loss of the fiber. The modeled hollow-core optical fiber 100 of Example 1 has a cross section that is schematically depicted in FIG. 1. The modeled hollow-core optical fiber 100 had six cladding elements 120a, 120b, 120c, 120d, 120e, and 120f, and a substrate 130. Each cladding element 120 included a wound glass sheet 140 (wound glass sheets 140a, 140b, 140c, 140d, 140e, and 140f) configured as a spiral. Each spiral had four turns. The distance D that an inner surface of the wound glass sheet 140 and an adjacent outer surface of the wound glass sheet 140 were spaced apart (for all turns) was 2000 nm. The inner radius of each spiral was 3 µm. The thickness of each wound glass sheet 140 was 500 nm. The hollow core 110 had a diameter of about 30 µm. The substrate 130 had an inner diameter of 72 µm and a thickness of 20 µm. The substrate 130 and the plurality of cladding elements 120 comprised pure silica. As shown in FIG. 1, the position of the cladding elements 120 was symmetric with a uniform 60° rotational separation in the circumferential direction 190.

Figure 11:
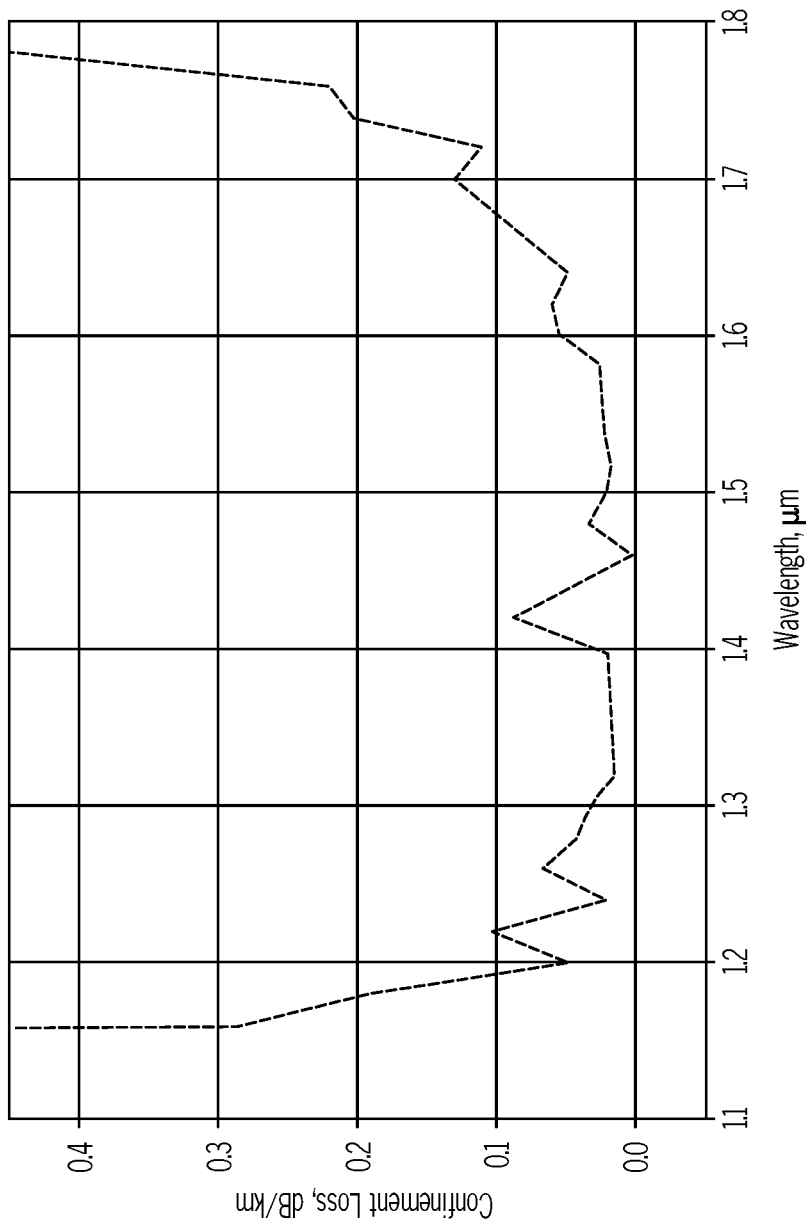
FIG. 11 graphically depicts the confinement loss of the hollow-core optical fiber of Example 1 as a function of wavelength.

The confinement loss of the optical fiber was modeled using COMSOL Multiphysics® modeling software over wavelengths ranging from 1100 nm to 1800 nm. The results are shown in FIG. 11. According to the model, the hollow-core optical fiber 100 of Example 1 provided good confinement of a fundamental mode of an optical signal to the hollow core 110 of the fiber. In particular, the confinement loss of the hollow-core optical fiber 100 of Example 1 was from 0.002 dB/km to 0.01 dB/km in a broad band from 1200 nm to 1650 nm.

Example 2—Modeling Confinement Loss of a Hollow-Core Optical Fiber and a Comparative Hollow-Core Optical Fiber A hollow-core optical fiber 100 was modeled to determine the confinement loss of the fiber. The modeled hollow-core optical fiber 100 had six cladding elements 120 and a substrate 130. Each cladding element 120 included a wound glass sheet 140 configured as a spiral. Each spiral had 4 turns. The distance that an inner surface of the wound glass sheet 140 and an adjacent outer surface of the wound glass sheet 140 were spaced apart was 2000 nm. The inner radius of each spiral was 3 µm. The thickness of each wound glass sheet 140 was 500 nm. The hollow core 110 had a diameter of about 30 µm. The substrate 130 had an inner diameter of 72 µm and a wall thickness of 20 µm. The position of the cladding elements 120 was symmetric with a 60° rotational symmetry or six repetitions. The confinement loss of the hollow-core optical fiber 100 of Example 2 was modeled using COMSOL Multiphysics® modeling software. The confinement loss of the hollow-core optical fiber was 0.02 dB/km at a wavelength of 1550 nm.

Figure 12:
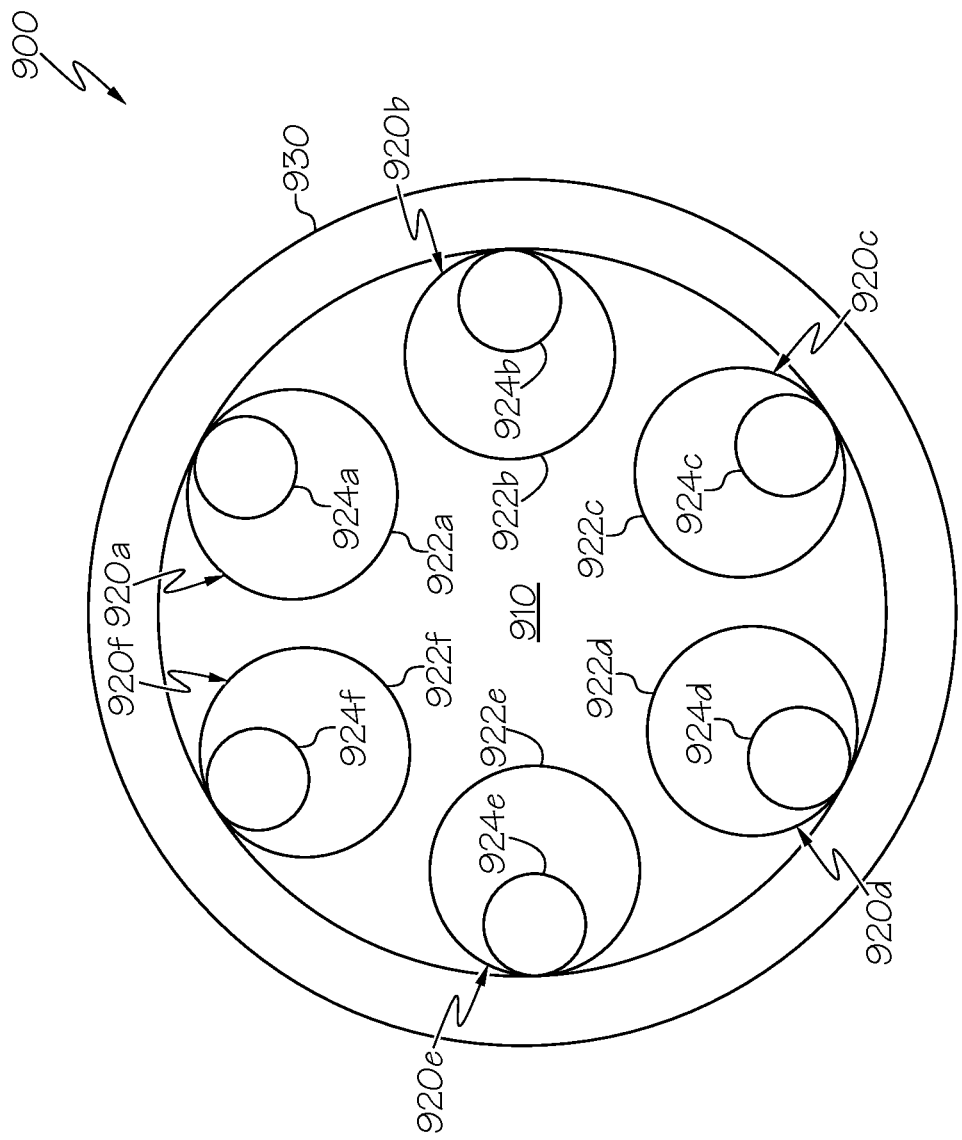
FIG. 12 schematically depicts a cross-sectional view of the comparative hollow-core optical fiber of Example 2.

A comparative hollow-core optical fiber 900 was modeled to determine the confinement loss of the fiber. A cross section of the modeled comparative hollow-core optical fiber 900 is depicted in FIG. 12. The comparative hollow-core optical fiber 900 includes a substrate 930 and six cladding elements 920a, 920b, 920c, 920d, 920e, and 920f. Each cladding element 920 included a primary capillary 922 (primary capillaries 922a, 922b, 922c, 922d, 922e, and 922f) and a nested capillary 924 (nested capillaries 924a, 924b, 924c, 924d, 924e, and 924f). Each primary capillary 922 had an outer diameter of 27.5 μm and a wall thickness of 500 nm. Each nested capillary 924 had an outer diameter of 13 μm and a wall thickness of 530 nm. The substrate 930 had an inner diameter of 125 μm and a wall thickness of 20 μm. The hollow core 910 had a diameter of about 34.5 μm. As shown in FIG. 12, the position of the cladding elements 920 was symmetric with a 60° rotational symmetry or six repetitions. The confinement loss of the hollow-core optical fiber 100 of Example 2 was modeled using Comsol Multiphysics® modeling software. The confinement loss of the hollow-core optical fiber was 0.17 dB/km at a wavelength of 1550 nm. Accordingly, the hollow-core optical fiber 100 of Example 2 had a lower confinement loss that the comparative hollow-core optical fiber 900 of Example 2.

Example 3—Modeling Confinement Loss of a Hollow-Core Optical Fiber

Figure 13:
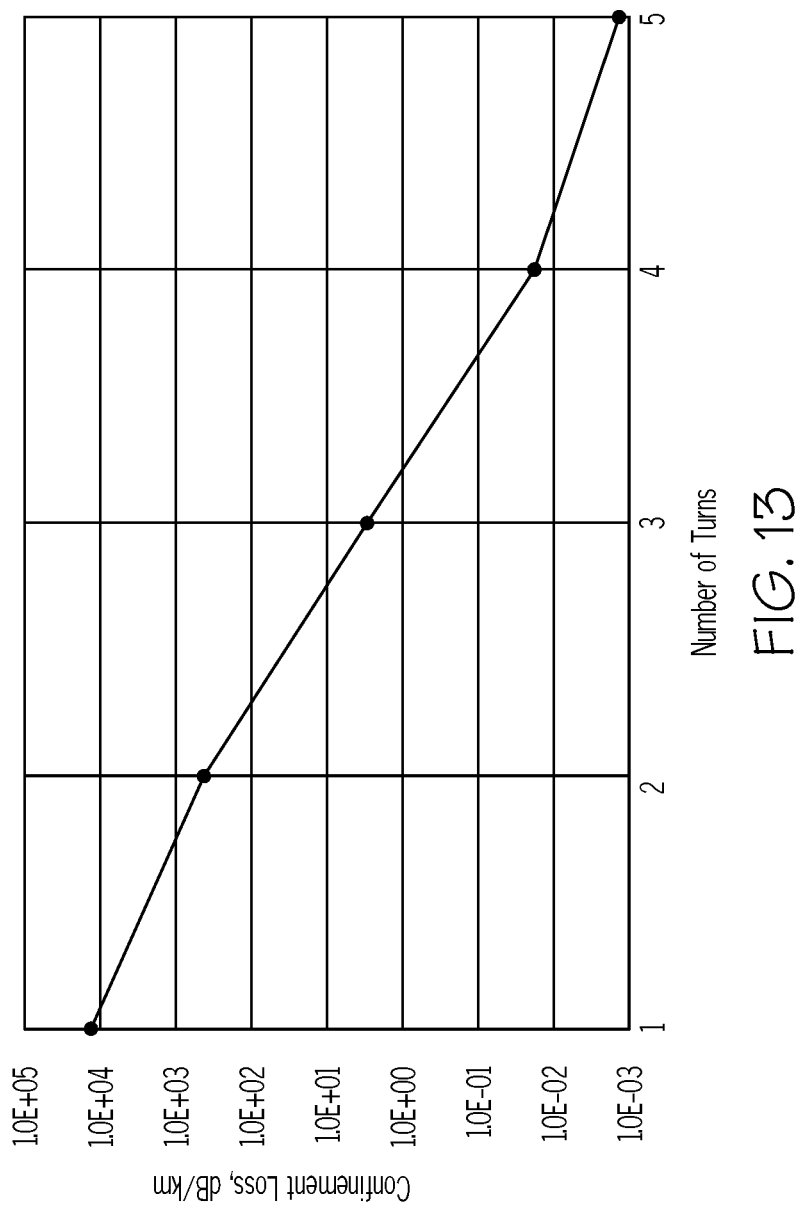
FIG. 13 graphically depicts the confinement loss of the hollow-core optical fiber of Example 3 as a function of the number of turns in the wound glass sheet.

A hollow-core optical fiber 100 having the structure of the hollow-core optical fiber 100 of Example 1 was modeled to determine the confinement loss of the hollow-core optical fiber 100 as a function of the number of turns in the spiral of each cladding element 120. The hollow-core optical fiber 100 was modeled with six cladding elements 120 each comprising a wound glass sheet 140 configured as a spiral. The hollow-core optical fiber was modeled for a spiral having 1 turn, 2 turns, 3 turns, 4 turns, and 5 turns. The confinement loss of the hollow-core optical fiber 100 as the number of turns of the spiral changed is depicted in FIG. 13. As shown in FIG. 13, as the number of turns in the spiral of the wound glass sheets 140 increased, the confinement loss of the hollow-core optical fiber decreased. This is likely due to an increased number of surfaces that may exhibit an anti-resonant effect or an inhibited coupling mechanism to confine light to the hollow core 110 of the hollow-core optical fiber 100 when the spiral has an increased number of turns.

Example 4—Modeling Confinement Loss as a Function of Radius of Curvature

The confinement losses of three hollow-core optical fibers 100 were modeled as a function of radius of curvature from 0 cm to 20 cm. Each of the three hollow-core optical fibers had six cladding elements 120 positioned uniformly in the circumferential direction 190 and a substrate 130 having an inner surface 132 to which each of the six cladding elements 120 was attached. Each cladding element 120 included a wound glass sheet 140 configured as a spiral. The distance D that an inner surface of the wound glass sheet 140 and an adjacent outer surface of the wound glass sheet 140 were spaced apart was 2000 nm. The thickness of each wound glass sheet 140 was 500 nm. The hollow core 110 had a diameter of about 30 μm. The substrate 130 had a wall thickness of 20 μm.

The number of turns, the inner diameter of the spiral, and the inner diameter of the substrate varied between the three hollow-core optical fibers modeled in Example 4. The wound glass sheets of the first hollow-core optical fiber were configured as spirals having 3 turns and an inner diameter of 8 μm. The substrate of the first hollow core-optical fiber had an inner diameter of 62 μm. The wound glass sheets 140 of the second hollow-core optical fiber were configured as spirals having 4 turns and an inner diameter of 6 μm. The substrate of the second hollow-core optical fiber had an inner diameter of 72 μm. The wound glass sheets 140 of the third hollow-core optical fiber were configured as spirals having 5 turns and an inner diameter of 4 μm. The substrate of the third hollow-core optical fiber had an inner diameter of 82 μm.

Figure 14:
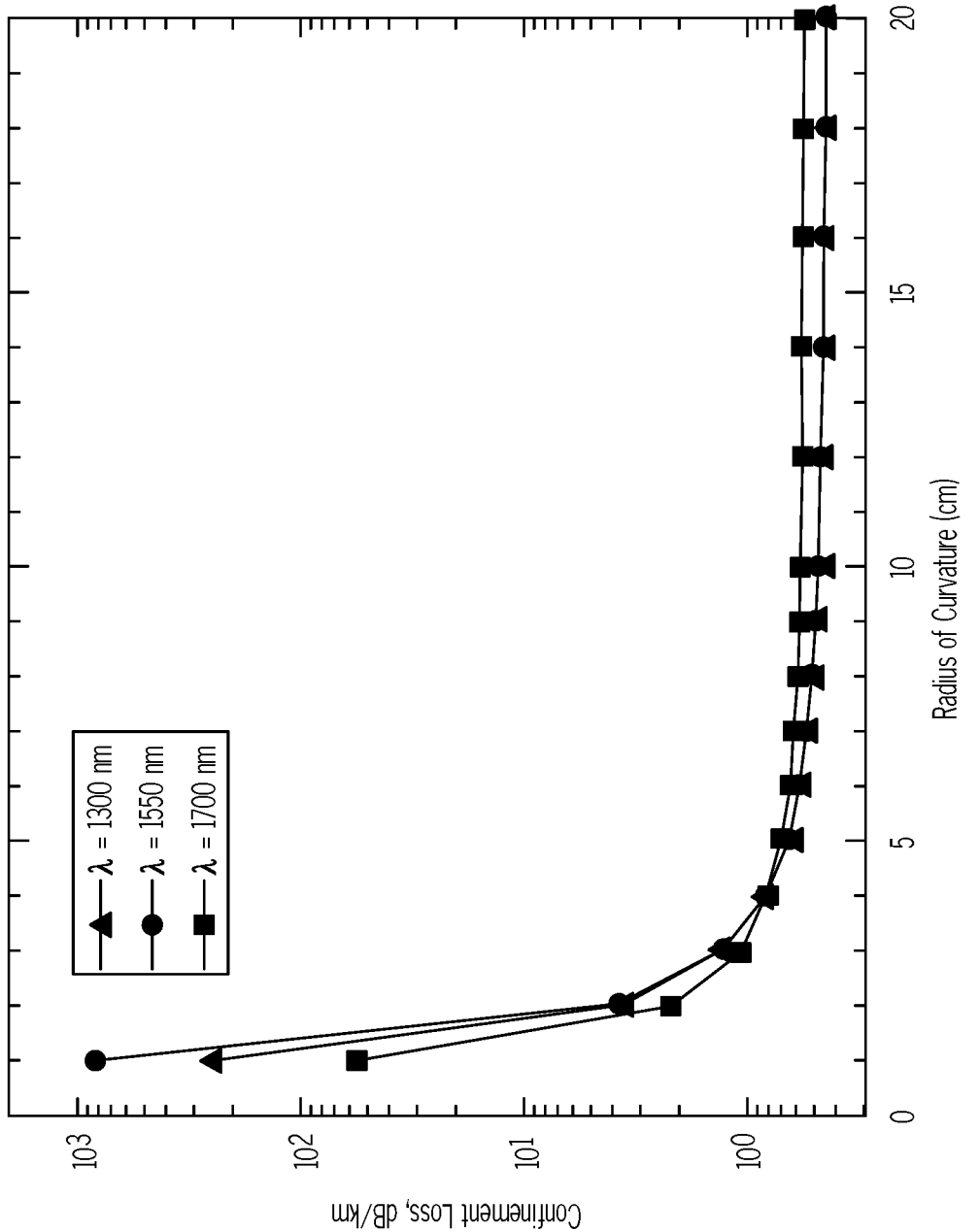
FIG. 14 graphically depicts the confinement loss of a hollow-core optical fiber of Example 4 as a function of radius of curvature.
Figure 15:
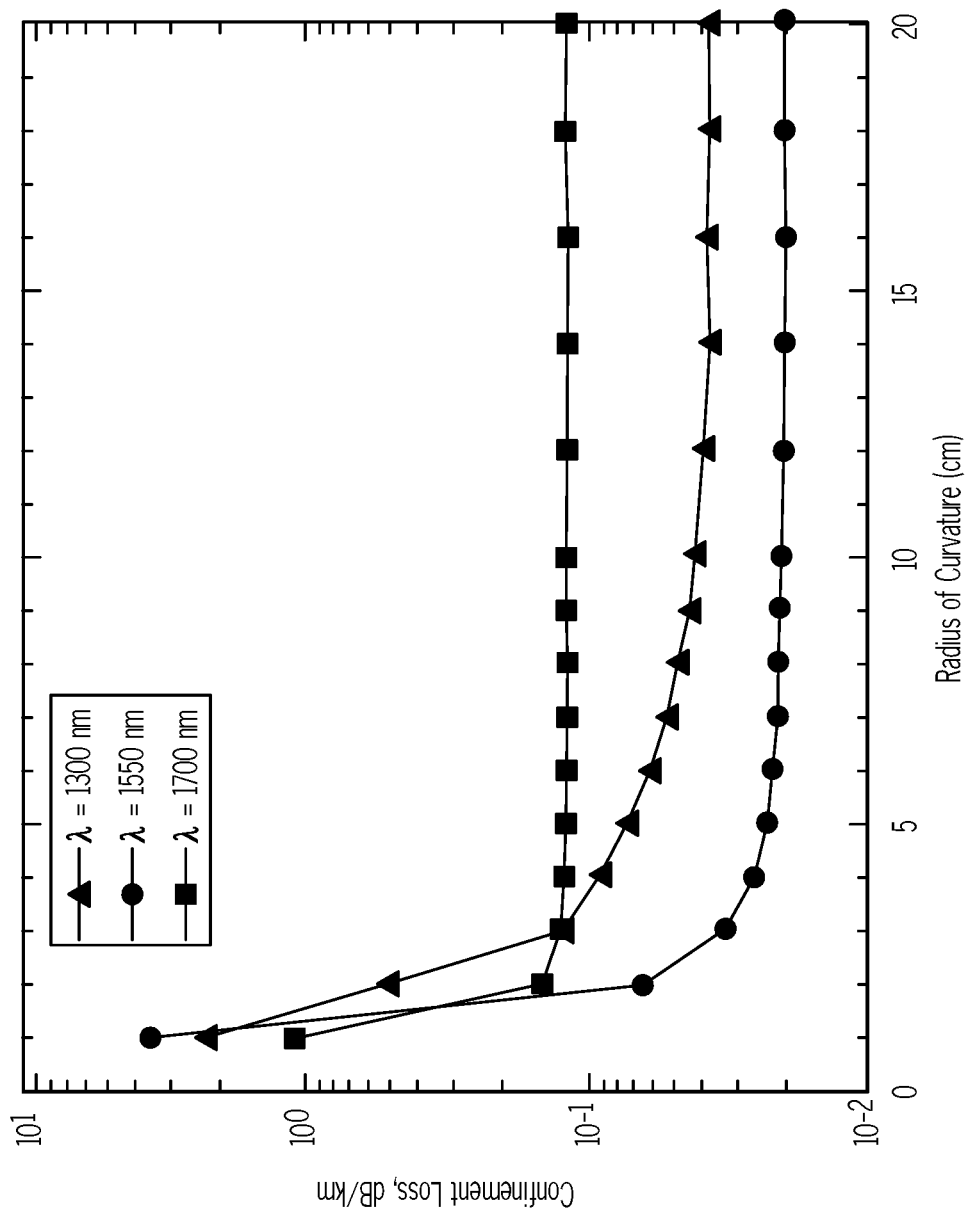
FIG. 15 graphically depicts the confinement loss of a hollow-core optical fiber of Example 4 as a function of radius of curvature.
Figure 16:
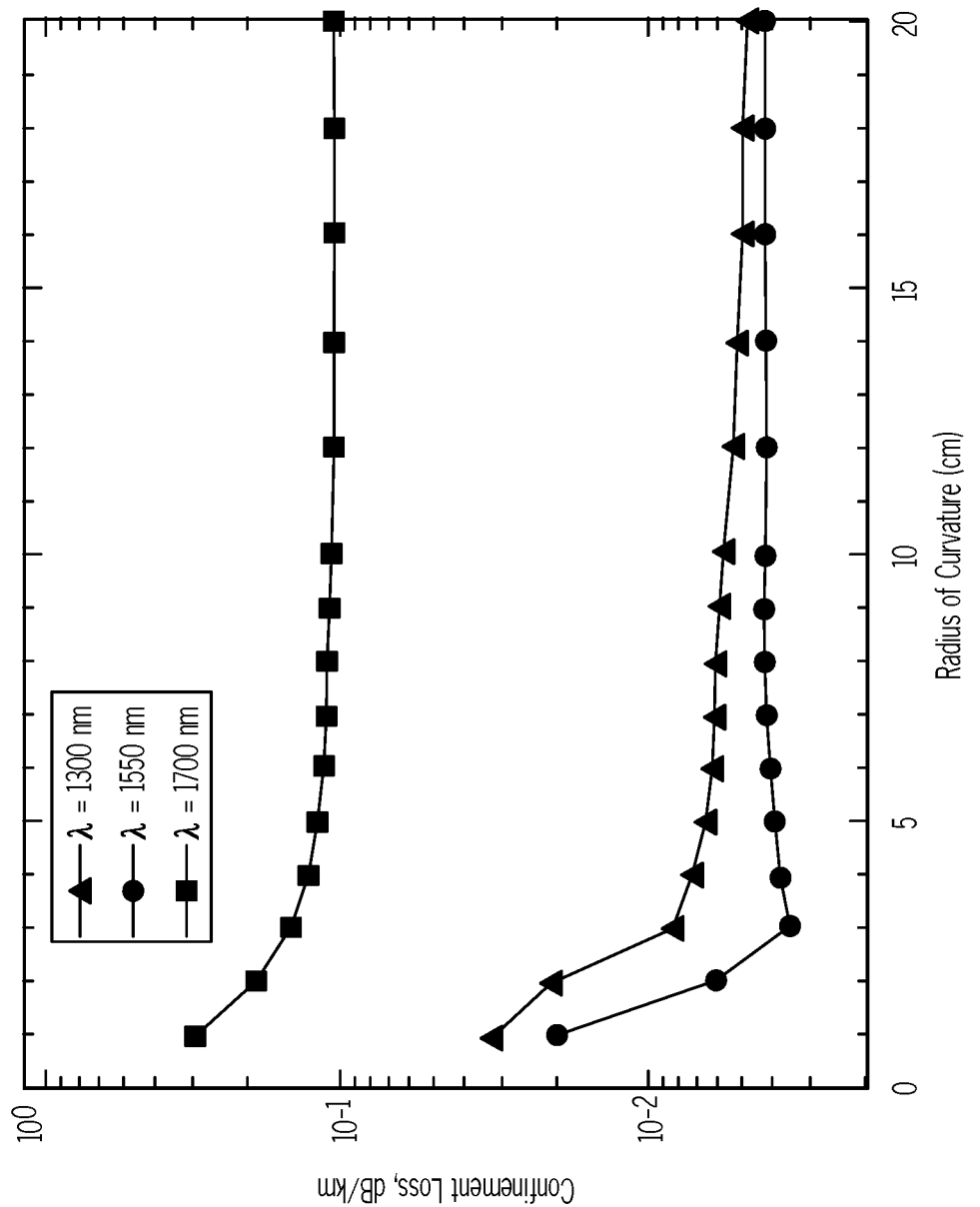
FIG. 16 graphically depicts the confinement loss of a hollow-core optical fiber of Example 4 as a function of radius of curvature.

The confinement loss of each of the three hollow-core optical fibers of Example 4 were modeled using COMSOL Multiphysics® modeling software. The confinement loss of each hollow-core optical fiber 100 of Example 4 was modeled at a wavelength of 1300 nm, 1550 nm, and 1700 nm as a function of a radius of curvature from 1 cm to 20 cm. The modeling results of the first hollow-core optical fiber are included in FIG. 14. The modeling results of the second hollow-core optical fiber are included in FIG. 15, and the modeling results of the third hollow-core optical fiber are included in FIG. 16. As shown in FIGS. 14-16, as the number of turns in the spiral increased, the confinement loss generally decreased.

Figure 17:
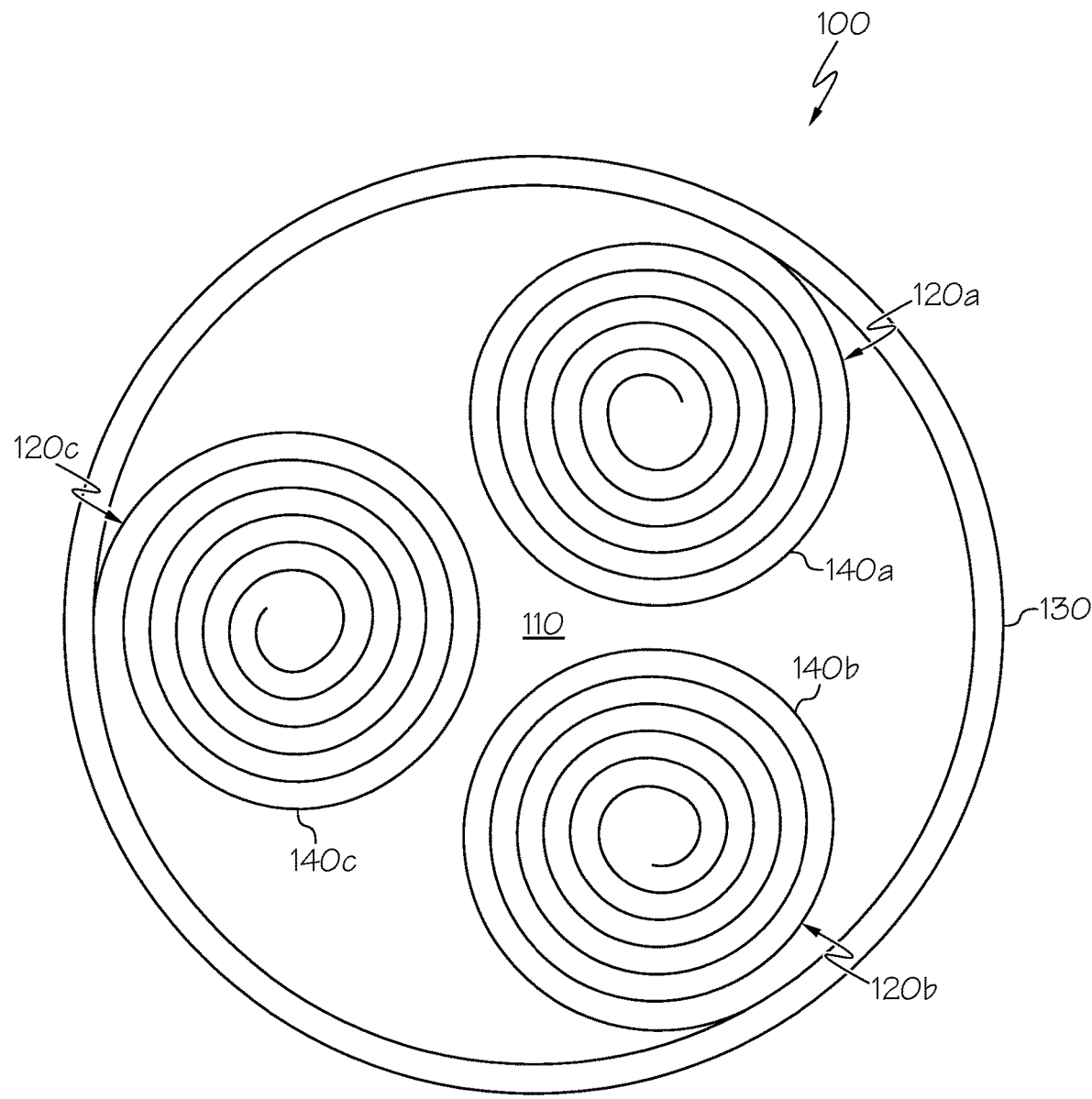
FIG. 17 schematically depicts a cross-sectional view of the comparative hollow-core optical fiber of Example 5.

Example 5—Modeling Confinement Loss of Hollow-Core Optical Fibers and Comparative Hollow-Core Optical Fibers Two hollow-core optical fibers 100 were modeled to determine the confinement losses of the fibers. The first modeled hollow-core optical fiber 100 of Example 5 has a cross section that is schematically depicted in FIG. 17. The first modeled hollow-core optical fiber 100 had three cladding elements 120a, 120b, and 120c, and a substrate 130. Each cladding element 120 included a wound glass sheet 140 (wound glass sheets 140a, 140b, and 140c) configured as a spiral. Each spiral had five turns. The distance that an inner surface of the wound glass sheet 140 and an adjacent outer surface of the wound glass sheet 140 were spaced apart was 7 μm. The inner radius of each spiral was 4 μm. The thickness of each wound glass sheet 140 was 400 nm. The hollow core 110 had a diameter of 17 μm. The substrate 130 had an inner diameter of 147.4 μm and a wall thickness of 10 μm. The substrate 130 and the plurality of cladding elements 120 comprised pure silica. As shown in FIG. 13, the position of the cladding elements 120 was symmetric with a 120° rotational symmetry or three repetitions. The confinement loss of the first hollow-core optical fiber 100 of Example 5 was modeled using COMSOL Multiphysics® modeling software. The confinement loss of the first hollow-core optical fiber of Example 5 was 0.0005 dB/km at a wavelength of 1550 nm.

A second hollow-core optical fiber 100 was modeled to determine the confinement loss of the hollow-core optical fiber. The second hollow-core optical fiber 100 of Example 5 had the same structure as the first hollow-core optical fiber 100 of Example 5, except that the diameter of the hollow core 110 was 10 μm. The confinement loss of the second hollow-core optical fiber of Example 5 was 0.018 dB/km at a wavelength of 1550 nm.

The confinement losses of two comparative hollow-core optical fibers 900 were calculated from the data included in F. Poletti, "Nested antiresonant nodeless hollow core fiber", Opt. Express 22, 23807-23828, (2014). Each comparative hollow-core optical fiber 900 had the structure depicted in FIG. 12. The first comparative hollow-core optical fiber 900 had a hollow-core 910 with a diameter of 8.5 μm, and the second comparative hollow-core optical fiber 900 had a hollow core 910 with a diameter of 5 μm. The confinement loss of the first comparative hollow-core optical fiber 900 was about 6 orders of magnitude greater than the confinement loss of the first hollow-core optical fiber 100 of Example 5. Likewise, the confinement loss of the second comparative hollow-core optical fiber 900 was about 6 orders of magnitude greater than the confinement loss of the second hollow-core optical fiber 100 of Example 5.

Example 6—Modeling Confinement Loss of a Hollow-Core Optical Fiber as a Function of Wavelength A hollow-core optical fiber 100 was modeled to determine the confinement loss of the fiber. The hollow-core optical fiber 100 of Example 6 has a cross section that is schematically depicted in FIG. 17. The modeled hollow-core optical fiber 100 had three cladding elements 120a, 120b, and 120c, and a substrate 130. Each cladding element 120 included a wound glass sheet 140 (wound glass sheets 140a, 140b, and 140c) configured as a spiral. Each spiral had five turns. The distance that an inner surface of the wound glass sheet 140 and an adjacent outer surface of the wound glass sheet 140 were spaced apart was 7 µm. The inner diameter of each spiral was 8 µm. The thickness of each wound glass sheet 140 was 400 nm. The hollow core 110 had a diameter of 17 µm. The substrate 130 had an inner diameter of 147.4 µm and a wall thickness of 10 µm. The substrate 130 and the plurality of cladding elements 120 comprised pure silica. As shown in FIG. 17, the position of the cladding elements 120 was symmetric with a 120° rotational symmetry or three repetitions.

Figure 18:
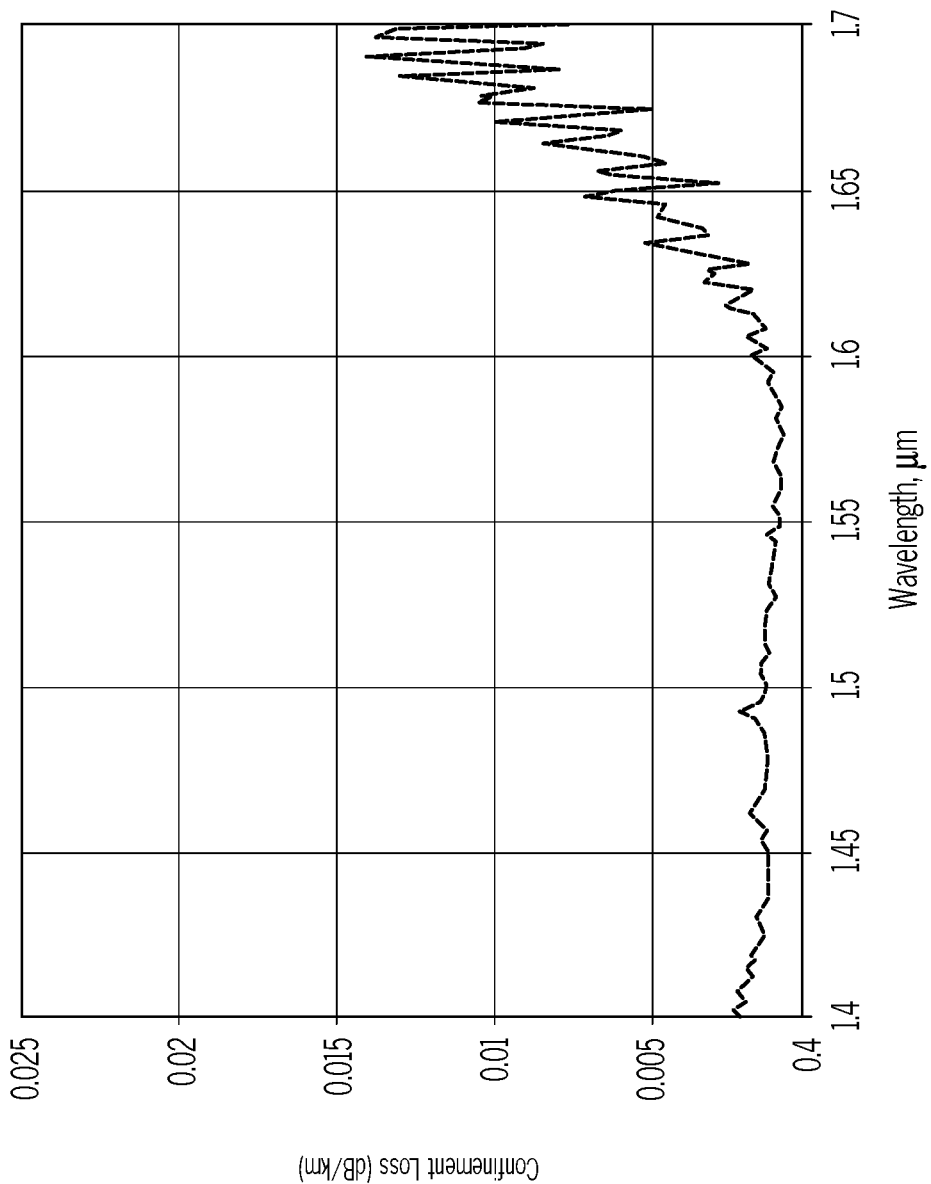
FIG. 18 graphically depicts the confinement loss of the hollow-core optical fiber of Example 6 as a function of wavelength.

The confinement loss of the optical fiber was modeled using COMSOL Multiphysics® modeling software over wavelengths ranging from 1400 nm to 1700 nm. The results are shown in FIG. 18.

Example 7—Modeling Confinement Loss as a Function of Radius of Curvature

Figure 19:
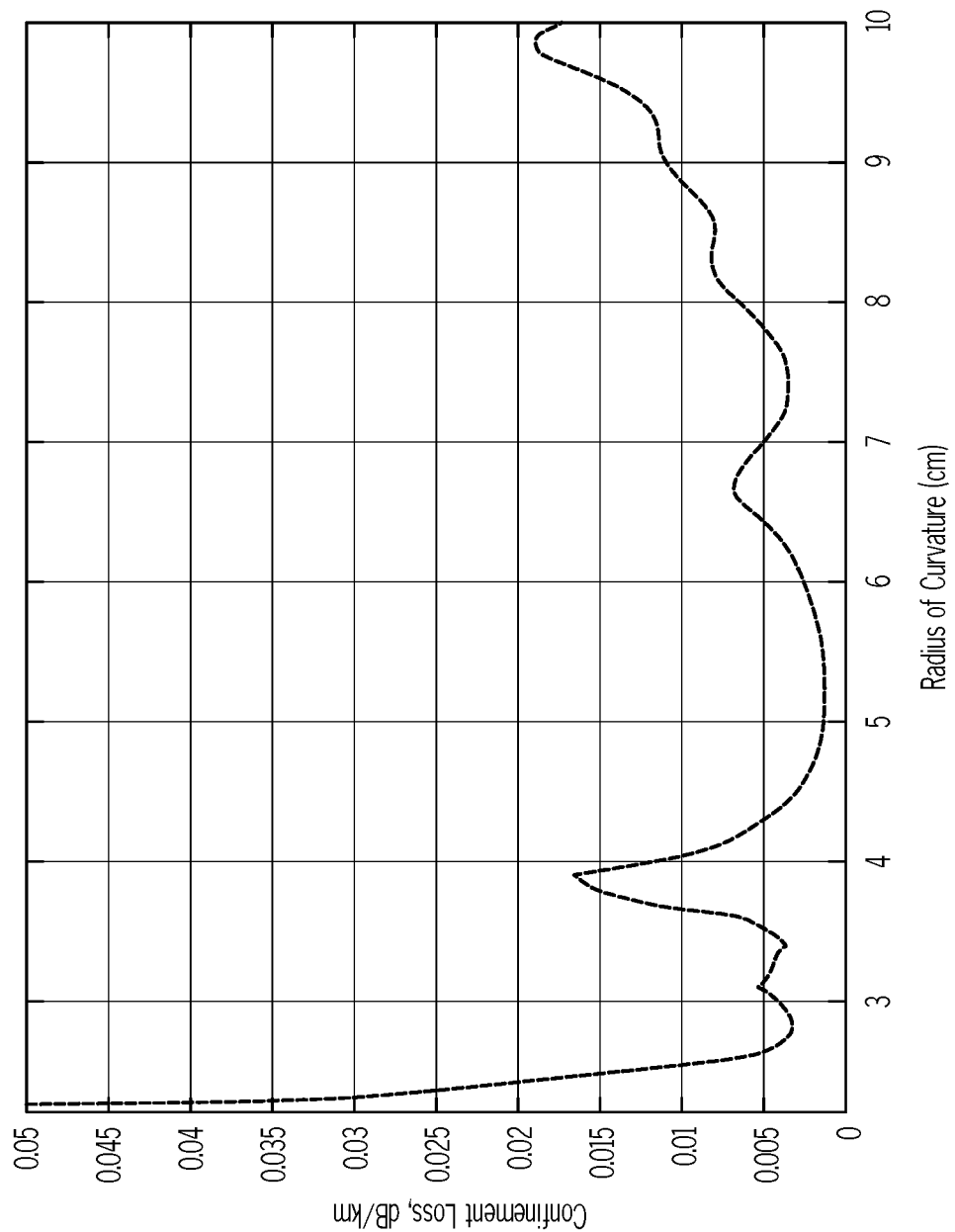
FIG. 19 graphically depicts the confinement loss of a hollow-core optical fiber of Example 7 as a function of radius of curvature.

The confinement loss of a hollow-core optical fiber 100 of was modeled as a function of radius of curvature. The hollow-core optical fiber 100 had the structure described in Example 6. The confinement loss of the hollow-core optical fiber 100 was modeled at a wavelength of 1550 nm as a function of a radius of curvature from 0 cm to 10 cm. The modeling results of the first hollow-core optical fiber are included in FIG. 19. At a radius of curvature of 3 cm, the confinement loss of the hollow-core optical fiber was 0.005 dB/km. When the radius of curvature was from 3 cm to 10 cm, the confinement loss of the hollow-core optical fiber was less than 0.02 dB/km.

The present disclosure is directed to various embodiments of hollow-core optical fibers. In embodiments, the hollow-core optical fiber comprises a substrate, the substrate comprising a tubular shape and an inner surface surrounding a central longitudinal axis of the hollow-core optical fiber; a hollow core extending through the substrate along the central longitudinal axis; and a plurality of cladding elements positioned between the central longitudinal axis of the hollow-core optical fiber and the substrate. Each of the plurality of cladding elements may include a wound glass sheet configured as a spiral, and each of the plurality of cladding elements may contact an interior surface of the substrate. The hollow-core optical fibers may be operable to transmit optical signals, and the cladding elements may reduce attenuation of the optical signals through one or more of an anti-resonant effect and an inhibited coupling mechanism.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A hollow-core optical fiber comprising:
   a substrate, the substrate comprising a tubular shape and an inner surface surrounding a central longitudinal axis of the hollow-core optical fiber;
   a hollow core extending through the substrate along the central longitudinal axis of the hollow-core optical fiber; and
   a plurality of cladding elements positioned between the central longitudinal axis of the hollow-core optical fiber and the substrate, each of the plurality of cladding elements extending in a direction parallel to the central longitudinal axis of the hollow-core optical fiber and comprising a wound glass sheet configured as a spiral, wherein each of the plurality of cladding elements contacts the inner surface of the substrate.

2. The hollow-core optical fiber of claim 1, wherein the hollow-core optical fiber comprises greater than or equal to 3 and less than or equal to 11 cladding elements.

3. The hollow-core optical fiber of claim 1, wherein the spiral comprises greater than or equal to 2 and less than or equal to 12 turns.

4. The hollow-core optical fiber of claim 1, wherein the wound glass sheet has a thickness greater than or equal to 0.1 µm and less than or equal to 4.0 µm.

5. The hollow-core optical fiber of claim 1, wherein each cladding element of the plurality of cladding elements comprises a cladding element central longitudinal axis parallel to the central longitudinal axis of the hollow-core optical fiber, and the spiral of each cladding element is on a cross-section of the cladding element perpendicular to the cladding element central longitudinal axis.

6. The hollow-core optical fiber of claim 5, wherein an inner surface of the wound glass sheet and an adjacent outer surface of the same wound glass sheet are spaced apart by a distance greater than or equal to 1 µm less than or equal to 15 µm in a direction perpendicular to the cladding element central longitudinal axis.

7. The hollow-core optical fiber of claim 5, wherein the wound glass sheet comprises a plurality of slots such that the wound glass sheet is discontinuous in a cross section of the hollow-core optical fiber perpendicular to the cladding element central longitudinal axis.

8. The hollow-core optical fiber of claim 7, wherein the each of the plurality of slots extends in a direction parallel to the cladding element central longitudinal axis for a distance less than a length of the hollow-core optical fiber.

9. The hollow-core optical fiber of claim 1, wherein an inner end of the wound glass sheet is spaced apart from an inner surface of the wound glass sheet such that the spiral has an interior opening.

10. The hollow-core optical fiber of claim 1, wherein an inner end of the wound glass sheet contacts an inner surface of the wound glass sheet such that the spiral has a closed interior.

11. The hollow-core optical fiber of claim 1, wherein an outer end of the wound glass sheet is spaced apart from an outer surface of the wound glass sheet such that the spiral has an exterior opening.

12. The hollow-core optical fiber of claim 1, wherein an outer end of the wound glass sheet contacts an outer surface of the wound glass sheet such that the spiral has a closed exterior.

13. The hollow-core optical fiber of claim 1, wherein each cladding element is spaced apart from adjacent cladding elements in a circumferential direction about the central longitudinal axis.

14. The hollow-core optical fiber of claim 1, wherein each cladding element is spaced apart from adjacent cladding elements in a circumferential direction by a distance of less than or equal to 12 μm without contacting adjacent cladding elements.

15. The hollow-core optical fiber of claim 1, wherein the hollow core has a diameter of less than or equal to 25 μm.

16. The hollow-core optical fiber of claim 1, wherein the plurality of cladding elements are configured to provide an anti-resonant effect at the wavelength λ, the anti-resonant effect operable to confine an optical signal at the wavelength λ in the hollow core.

17. The hollow-core optical fiber of claim 16, wherein the plurality of cladding elements are configured such that a confinement loss of a fundamental mode of the optical signal propagating in the hollow-core optical fiber is less than or equal to $10^{-2}$ dB/km at the wavelength λ, wherein the wavelength λ is greater than or equal to 1200 nm and less than or equal to 1650 nm.

18. The hollow-core optical fiber of claim 16, wherein the hollow-core optical fiber has a bending loss of a fundamental mode of an optical signal propagating in the hollow core of less than or equal to 1 dB/km at the wavelength λ for a bend radius of 3 cm to 20 cm, wherein the wavelength λ is greater than or equal to 1300 nm and less than or equal to 1700 nm.

19. The hollow-core optical fiber of claim 1, wherein the hollow-core optical fiber is configured to provide single-mode operation at a wavelength of 1550 nm.

20. The hollow-core optical fiber of claim 1, wherein the cladding elements further comprise a glass layer surrounding or partially surrounding the spiral, the glass layer contacting the inner surface of the substrate.

* * * * *